US012570296B2

(12) United States Patent
Alvarez et al.

(10) Patent No.: US 12,570,296 B2
(45) Date of Patent: Mar. 10, 2026

(54) DRIVING SAFETY SYSTEMS

(71) Applicant: Mobileye Vision Technologies Ltd., Jerusalem (IL)

(72) Inventors: Ignacio J. Alvarez, Portland, OR (US); Florian Geissler, Munich (DE); Haitao Ji, Beijing (CN); Fei Li, Beijing (CN); Fabian Oboril, Karlsruhe (DE); Rafael Rosales, Unterhaching (DE); Kay-Ulrich Scholl, Malsch (DE); Xiangbin Wu, Beijing (CN); Xinxin Zhang, Beijing (CN); Zhiyuan Zhang, Beijing (CN); Qianying Zhu, Beijing (CN)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 17/642,739

(22) PCT Filed: Dec. 27, 2019

(86) PCT No.: PCT/CN2019/129169
§ 371 (c)(1),
(2) Date: Mar. 14, 2022

(87) PCT Pub. No.: WO2021/128278
PCT Pub. Date: Jul. 1, 2021

(65) Prior Publication Data
US 2022/0324467 A1 Oct. 13, 2022

(51) Int. Cl.
*B60W 50/00* (2006.01)
*B60W 60/00* (2020.01)

(52) U.S. Cl.
CPC .... *B60W 50/0098* (2013.01); *B60W 60/0015* (2020.02); *B60W 2050/0022* (2013.01);
(Continued)

(58) Field of Classification Search
CPC ......... B60W 50/0098; B60W 60/0015; B60W 2556/40; B60W 2556/45; B60W 2555/20;
(Continued)

(56) References Cited

U.S. PATENT DOCUMENTS

| | | | |
|---|---|---|---|
| 2013/0131920 A1 | 5/2013 | Meitinger et al. | |
| 2013/0218467 A1 | 8/2013 | Ogawa et al. | |

(Continued)

FOREIGN PATENT DOCUMENTS

| | | |
|---|---|---|
| CN | 102905916 A | 1/2013 |
| CN | 103998276 A | 8/2014 |

(Continued)

OTHER PUBLICATIONS

Federal Highway Research Institute (BASt) et al.; "German In-Depth Accident Study—GIDAS"; https://www.gidas.org; 1 page; retrieved on Mar. 8, 2022.

(Continued)

*Primary Examiner* — Jay Khandpur
(74) *Attorney, Agent, or Firm* — FINNEGAN, HENDERSON, FARABOW, GARRETT & DUNNER LLP

(57) ABSTRACT

A safety system (200) for a vehicle (100) is provided. The safety system (200) may include one or more processors (102). The one or more processors (102) may be configured to control a vehicle (100) to operate in accordance with the predefined stored driving model parameters, to detect vehicle operation data during the operation of the vehicle (100), to determine whether to change predefined driving model parameters based on the detected vehicle operation data and the driving model parameters, to change the driving model parameters to changed driving model parameters, and to control the vehicle (100) to operate in accordance with the changed driving model parameters.

30 Claims, 17 Drawing Sheets

300

(52) U.S. Cl.
CPC . *B60W 2050/0028* (2013.01); *B60W 2530/00*
(2013.01); *B60W 2540/00* (2013.01); *B60W*
*2555/20* (2020.02); *B60W 2555/60* (2020.02);
*B60W 2556/40* (2020.02); *B60W 2556/45*
(2020.02)

(58) Field of Classification Search
CPC ..... B60W 2555/60; B60W 2050/0022; B60W
2050/0028; B60W 2530/00; B60W
2540/00
See application file for complete search history.

(56) References Cited

U.S. PATENT DOCUMENTS

| | | | |
|---|---|---|---|
| 2014/0330503 A1 | 11/2014 | Johansson et al. | |
| 2015/0002808 A1* | 1/2015 | Rizzo, III | A61N 1/36046 |
| | | | 351/158 |
| 2016/0117871 A1* | 4/2016 | McClellan | G08G 1/052 |
| | | | 701/31.5 |
| 2016/0288923 A1* | 10/2016 | Hausmann | B64F 1/005 |
| 2016/0328647 A1* | 11/2016 | Lin | G06F 17/11 |
| 2017/0137013 A1 | 5/2017 | Sato | |
| 2018/0170375 A1 | 6/2018 | Jang et al. | |
| 2018/0210464 A1* | 7/2018 | Switkes | B60W 10/18 |
| 2018/0239359 A1 | 8/2018 | Jian | |
| 2018/0285736 A1* | 10/2018 | Baum | G06N 20/00 |
| 2018/0292222 A1* | 10/2018 | Lin | G05D 1/0088 |
| 2018/0339712 A1* | 11/2018 | Kislovskiy | H04L 67/34 |
| 2019/0351899 A1* | 11/2019 | Adam | B60W 50/0097 |
| 2020/0004242 A1* | 1/2020 | Kim | G05D 1/0088 |
| 2021/0191407 A1* | 6/2021 | Benisch | G05D 1/0219 |

FOREIGN PATENT DOCUMENTS

| | | | |
|---|---|---|---|
| CN | 104590263 A | 5/2015 | |
| CN | 106740854 A | 5/2017 | |
| CN | 106985656 A | 7/2017 | |
| EP | 3159235 A1 | 4/2017 | |
| JP | 2018167647 A | 11/2018 | |
| KR | 102012550 B1 | 8/2019 | |
| KR | 20190105172 A | 9/2019 | |

OTHER PUBLICATIONS

United States Department of Transportation; https://crashstats.nhtsa.
dot.gov; National Highway Traffic Safety Administration; 1 page;
retrieved on Mar. 8, 2022.
Rostislav Netek et al., "Implementation of Heat Maps in Geographical Information System—Exploratory Study on Traffic Accident Data", May 2, 2018, pp. 367-384, De Gruyter.
Shai Shalev-Shwartz et al.; "On a Formal Model of Safe and Scalable Self-driving Cars"; https://arxiv.org/abs/1708.06374; Mobileye; 2017; 37 pages.
David Nister et al.; "The Safety Force Field"; https://www.nvidia.
com/content/dam/en-zz/Solutions/self-driving-cars/safety-force-field/thesafety-force-field.pdf; Mar. 2019; 24 pages; retrieved on Mar. 8, 2022.
Bernd Gasmann et al., "Towards Standardization of AV Safety: C++ Library for Responsibility Sensitive Safety", Proceedings of the 2019 IEEE Intelligent Vehicles Symposium (IV), Jun. 9-12, 2019, pp. 2265-2281, IEEE, Paris, France.
International Search Report issued for the corresponding international patent application No. PCT/CN2019/129169 dated Sep. 17, 2020, 4 pages (for informational purpose only).
Extended European Search Report in counterpart European Patent Application No. 19957147.2 dated Jul. 26, 2023 (16 pages).
Examination Report in counterpart European Patent Application No. 19957147.2 dated Jun. 25, 2024 (8 pages).
Summons to attend oral proceedings pursuant to Rule 115(1) EPC of the European Patent Office in Application No. 19957147.2 dated Jul. 8, 2025 (17 pages).

* cited by examiner

Figure 5:
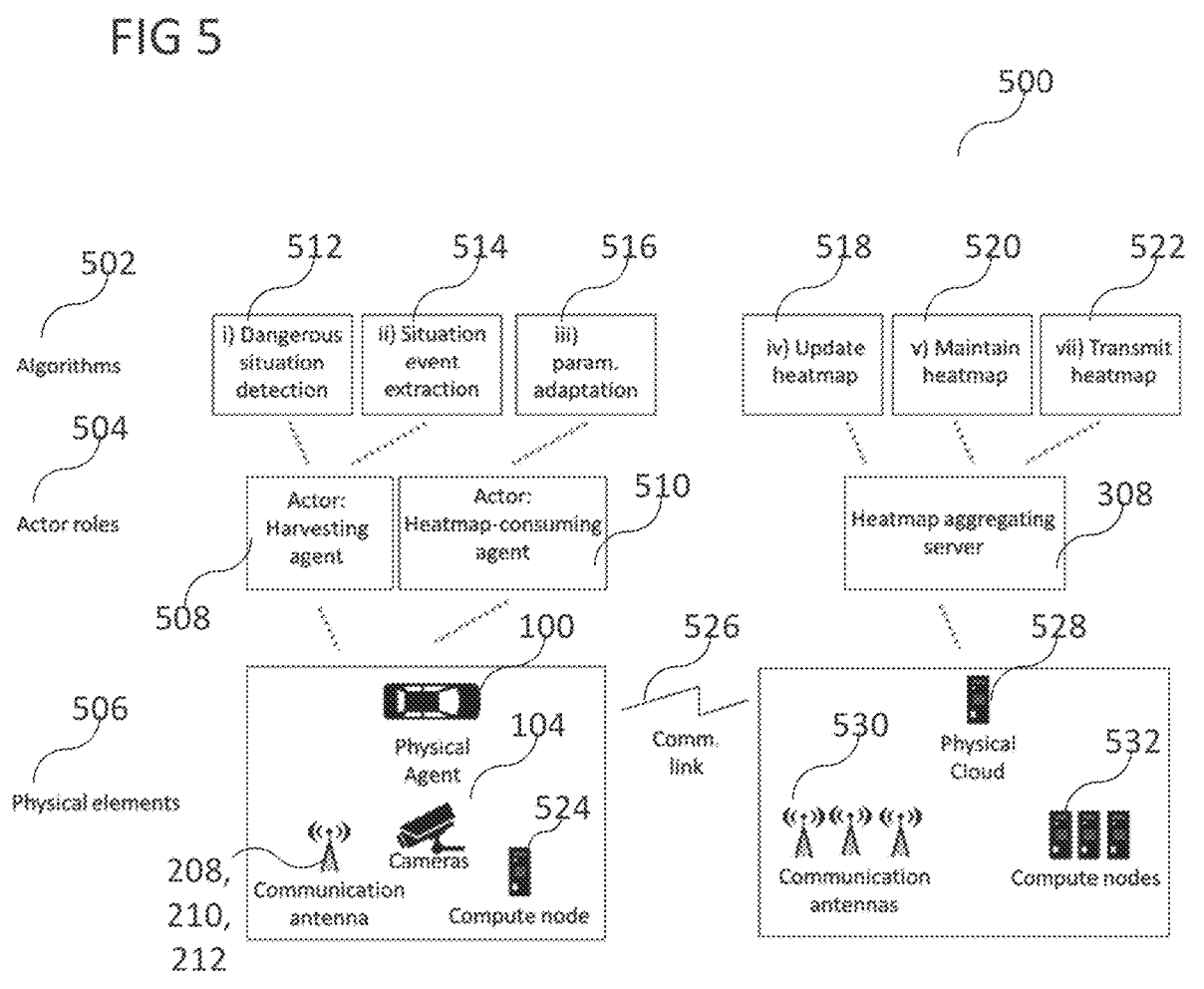

Algorithms

504

Actor roles

506

Physical elements 208,
210,
212

512 i) Dangerous
situation
detection

514 ii) Situation
event
extraction

516 iii)
param.
adaptation

518 iv) Update
heatmap

520 v) Maintain
heatmap

522 vii) Transmit
heatmap

508

Actor:
Harvesting
agent

510

Actor:
Heatmap-consuming
agent

308

Heatmap aggregating
server

100

Physical
Agent

104

Communication
antenna

Cameras

524

Compute node

526

Comm.
link

528

Physical
Cloud

530

Communication
antennas

532

Compute nodes

FIG8                                                                    800
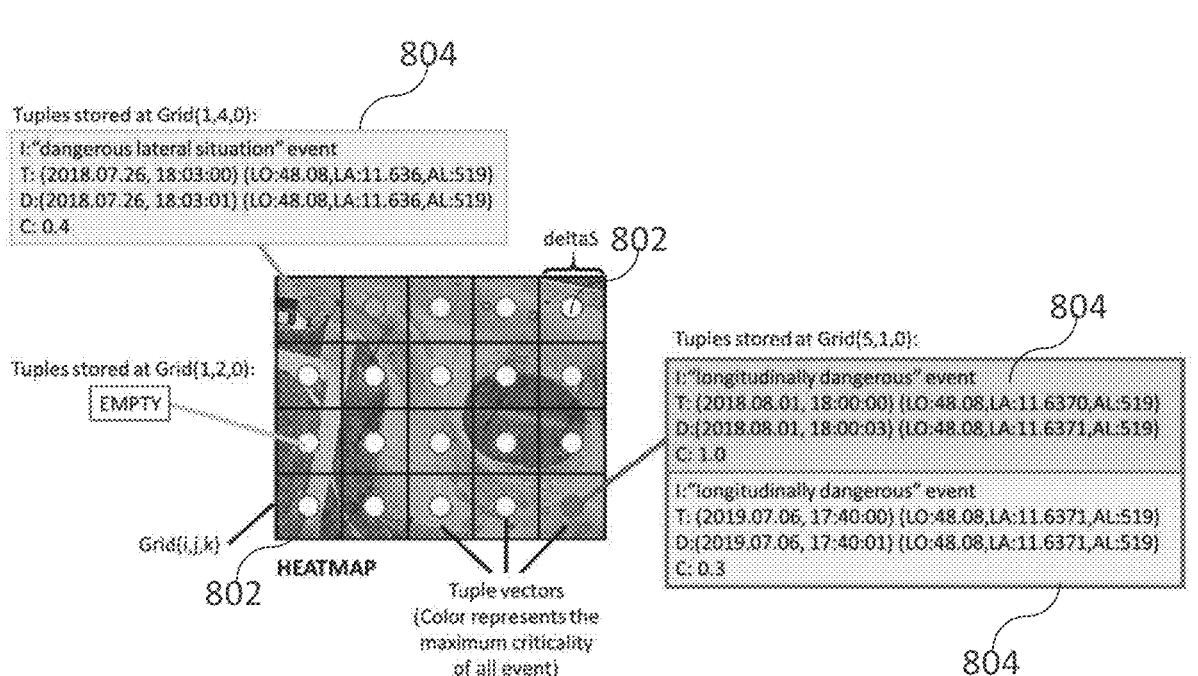
804
Tuples stored at Grid(1,4,0):
I:"dangerous lateral situation" event
T: (2018.07.26, 18:03:00) (LO:48.08,LA:11.636,AL:519)
D:(2018.07.26, 18:03:01) (LO:48.08,LA:11.636,AL:519)
C: 0.4
deltaS    802
Tuples stored at Grid(1,2,0):
EMPTY
Grid(i,j,k)
HEATMAP
802
Tuple vectors
(Color represents the
maximum criticality
of all event)
804
Tuples stored at Grid(5,1,0):
I:"longitudinally dangerous" event
T: (2018.08.01, 18:00:00) (LO:48.08,LA:11.6370,AL:519)
D:(2018.08.01, 18:00:03) (LO:48.08,LA:11.6371,AL:519)
C: 1.0
I:"longitudinally dangerous" event
T: (2019.07.06, 17:40:00) (LO:48.08,LA:11.6371,AL:519)
D:(2019.07.06, 17:40:01) (LO:48.08,LA:11.6371,AL:519)
C: 0.3
804

FIG 9

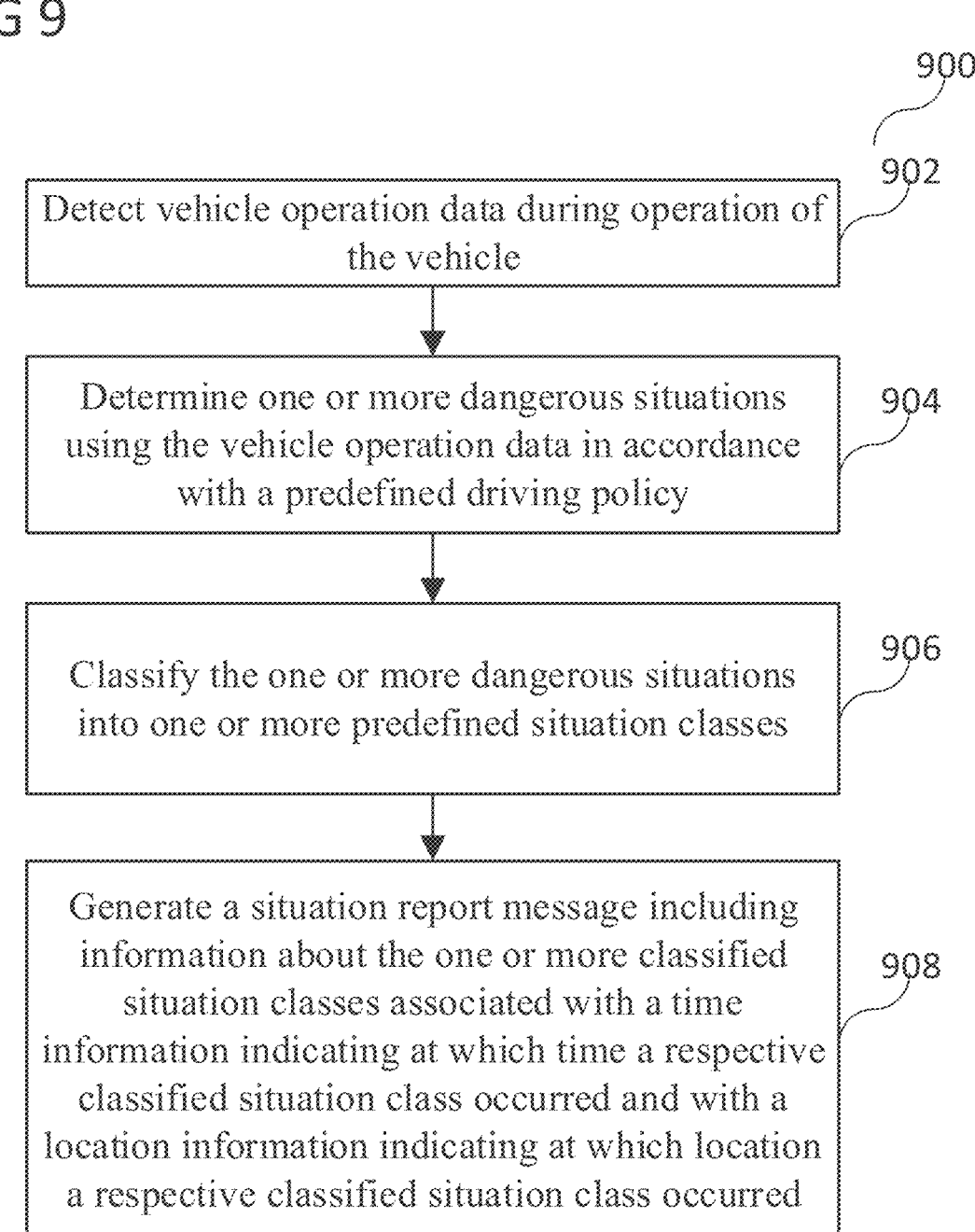

900

902
Detect vehicle operation data during operation of the vehicle

904
Determine one or more dangerous situations using the vehicle operation data in accordance with a predefined driving policy 906
Classify the one or more dangerous situations into one or more predefined situation classes 908
Generate a situation report message including information about the one or more classified situation classes associated with a time information indicating at which time a respective classified situation class occurred and with a location information indicating at which location a respective classified situation class occurred

Figure 10:
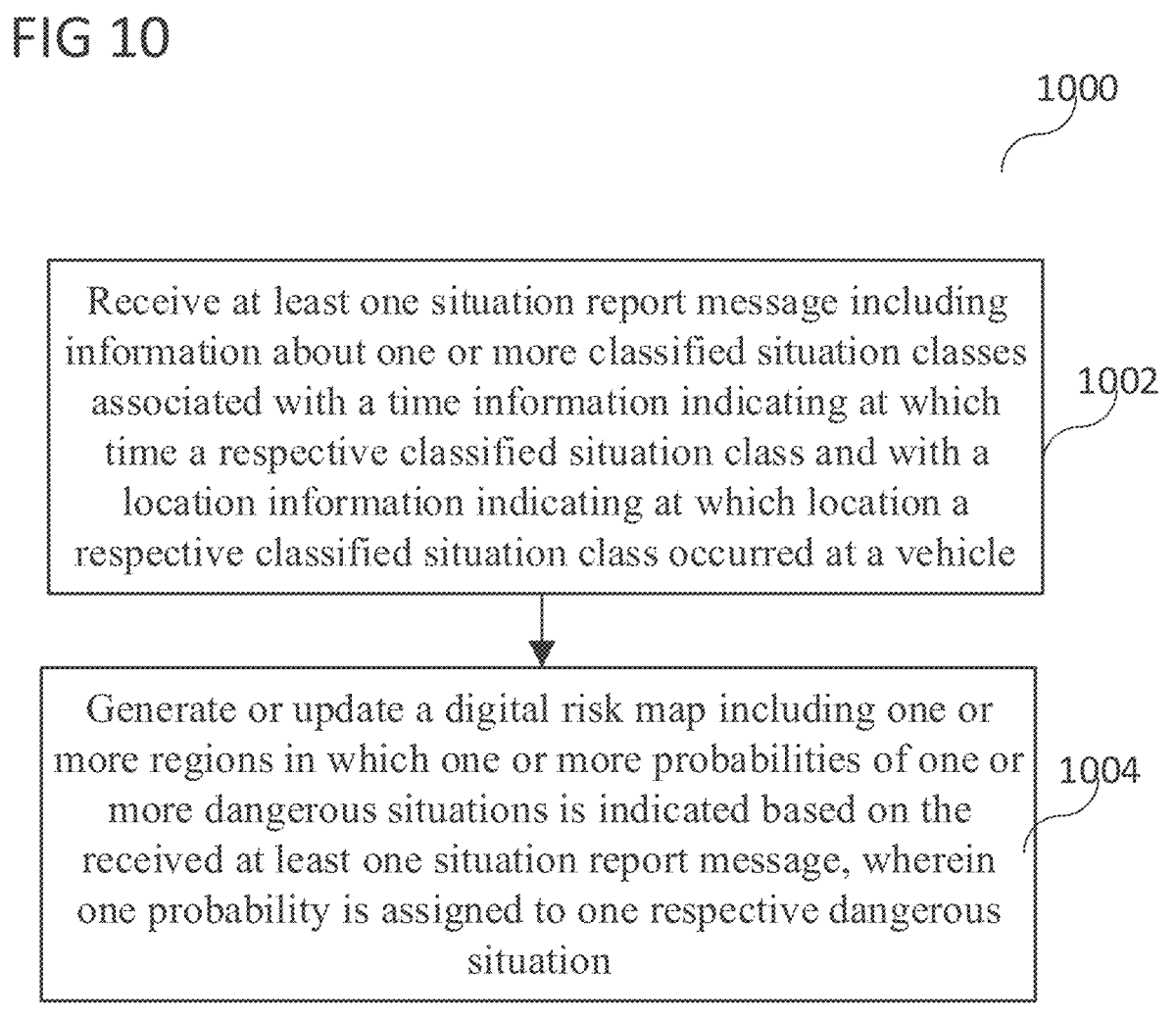

Receive at least one situation report message including information about one or more classified situation classes associated with a time information indicating at which time a respective classified situation class and with a location information indicating at which location a respective classified situation class occurred at a vehicle

1002

Generate or update a digital risk map including one or more regions in which one or more probabilities of one or more dangerous situations is indicated based on the received at least one situation report message, wherein one probability is assigned to one respective dangerous situation

Figure 14:
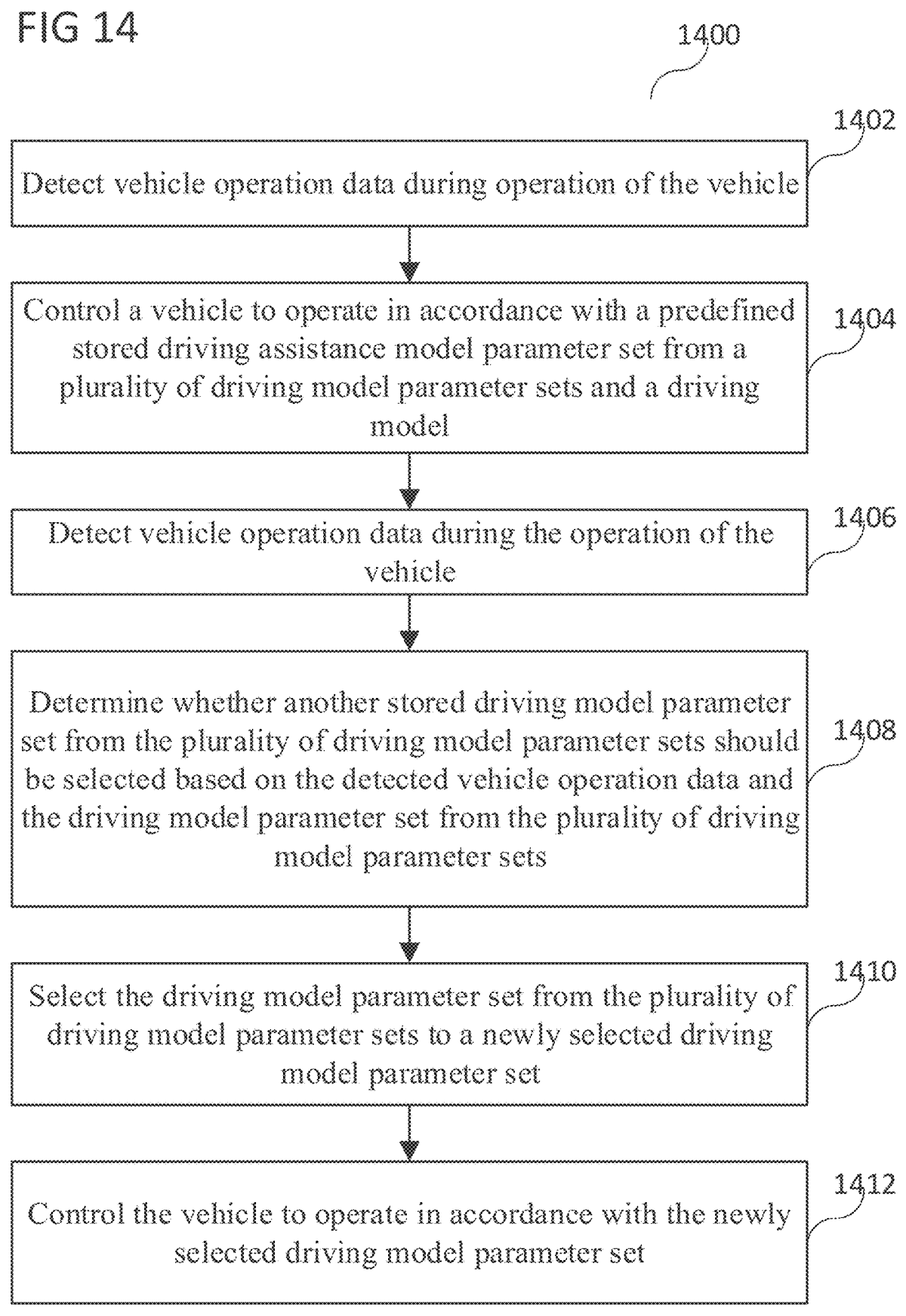

Detect vehicle operation data during operation of the vehicle

1404

Control a vehicle to operate in accordance with a predefined stored driving assistance model parameter set from a plurality of driving model parameter sets and a driving model

1406

Detect vehicle operation data during the operation of the vehicle

1408

Determine whether another stored driving model parameter set from the plurality of driving model parameter sets should be selected based on the detected vehicle operation data and the driving model parameter set from the plurality of driving model parameter sets

1410

Select the driving model parameter set from the plurality of driving model parameter sets to a newly selected driving model parameter set

1412

Control the vehicle to operate in accordance with the newly selected driving model parameter set

FIG 17

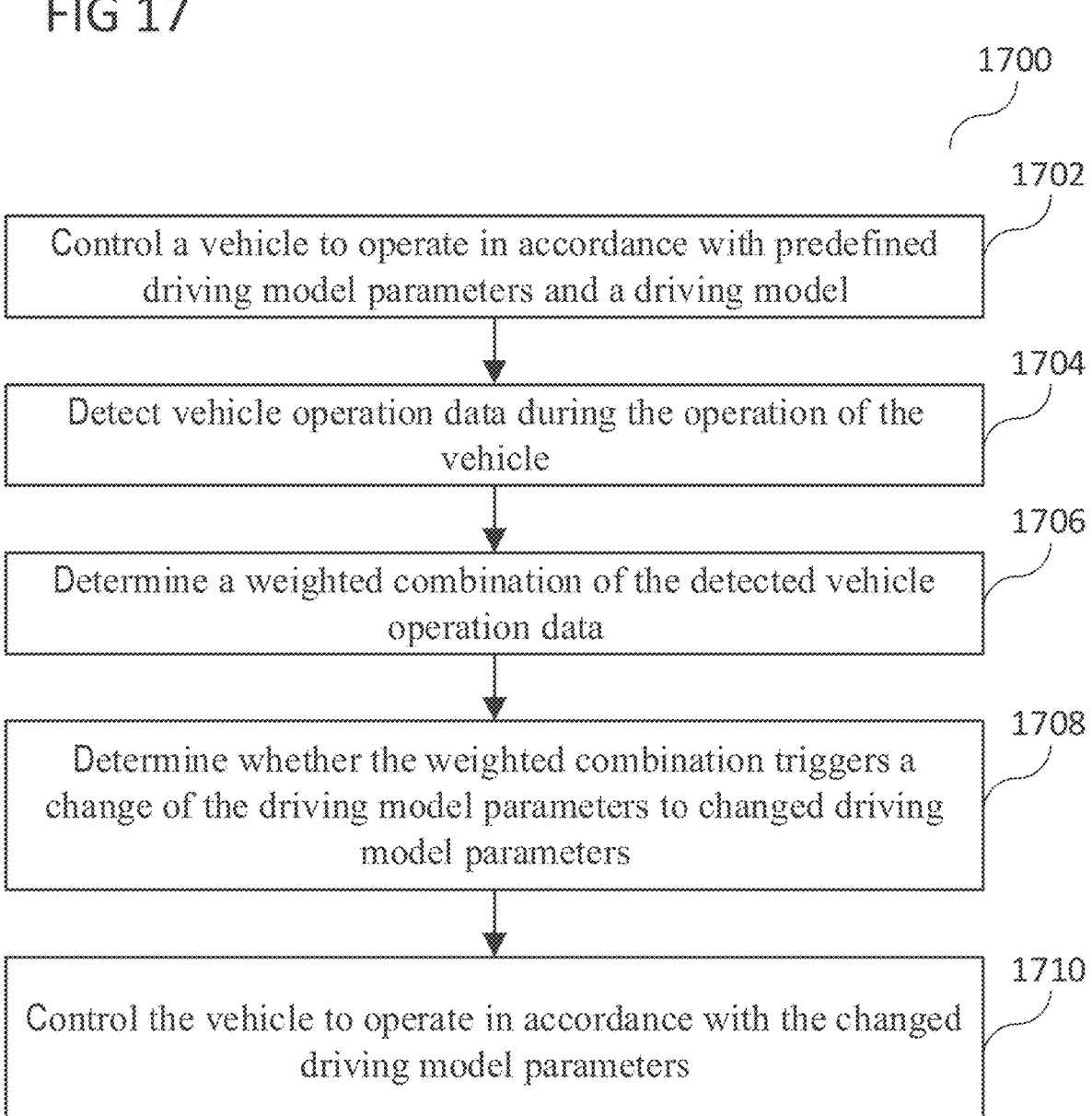

1700

1702
Control a vehicle to operate in accordance with predefined driving model parameters and a driving model 1704
Detect vehicle operation data during the operation of the vehicle 1706
Determine a weighted combination of the detected vehicle operation data 1708
Determine whether the weighted combination triggers a change of the driving model parameters to changed driving model parameters 1710
Control the vehicle to operate in accordance with the changed driving model parameters

DRIVING SAFETY SYSTEMS

RELATED APPLICATIONS

The present application is a national stage entry according to USC § 371 of PCT Application No. PCT/CN2019/129169, filed on Dec. 27, 2019, which is incorporated by reference herein in its entirety.

TECHNICAL FIELD

Various aspects of this disclosure generally relate to driving safety systems.

BACKGROUND

Autonomous Driving (AD) requires reliable driving safety systems that process detected data of the environment of an autonomous vehicle (AV) to implement a driving policy of the autonomous vehicle (AV). To do this, various driving models such as various safety driving models have been developed.

SUMMARY

A safety system for a vehicle is provided. The safety system may include one or more processors. The one or more processors may be configured to control a vehicle to operate in accordance with predefined driving model parameters, to detect vehicle operation data during the operation of the vehicle, to determine whether to change predefined driving model parameters based on the detected vehicle operation data and the driving model parameters, to change the driving model parameters to changed driving model parameters, and to control the vehicle to operate in accordance with the changed driving model parameters.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows an exemplary mapping of algorithms, acting entities and physical components of various aspects of this disclosure;

FIG. 8 shows an exemplary dynamic heatmap in accordance with various aspects of this disclosure;

FIG. 9 shows a method of operating a safety system for a vehicle;

FIG. 10 shows a method of operating a safety system for a vehicle;

FIG. 14 shows a method of operating a safety system for a vehicle;

FIG. 17 shows a method of operating a safety system for a vehicle.

DESCRIPTION

Figure 1:
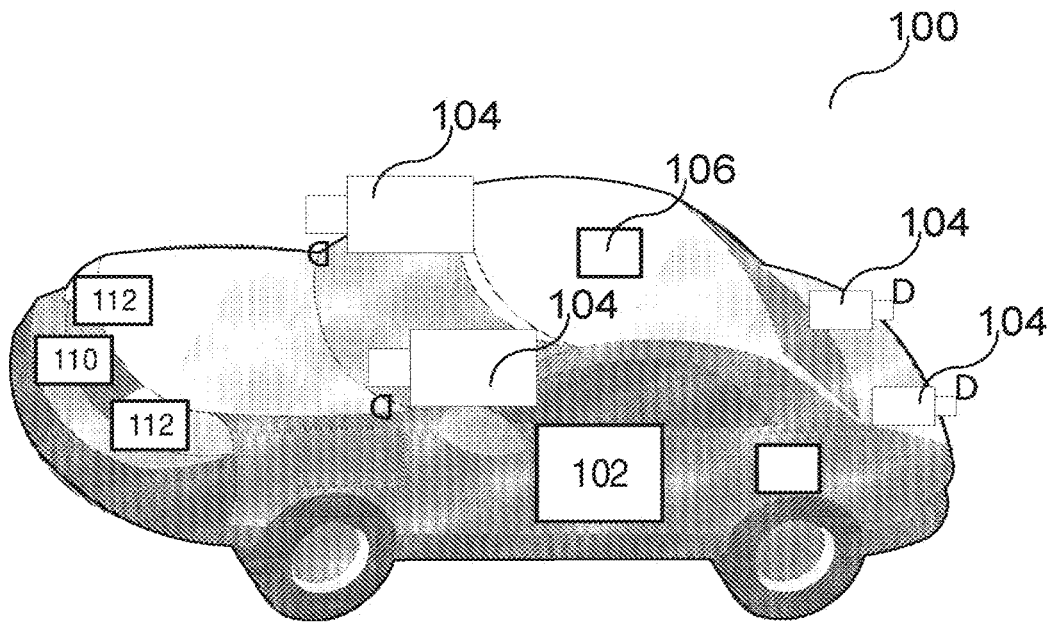
FIG. 1 shows an autonomous vehicle in accordance with various aspects of this disclosure.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The terms "processor" or "controller" as, for example, used herein may be understood as any kind of entity that allows handling data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

A "vehicle" is to be understood to include any type of driving object and may include automobiles, busses, mini busses, vans, trucks, mobile homes, vehicle trailers, motorcycles, bicycles, tricycles, moving robots, personal transporters.

A "ground vehicle" is to be understood any type of object driving on the ground, e.g. on a street.

The term "autonomous vehicle" refers to a vehicle capable of implementing at least one navigational change without driver input. A navigational change refers to a change in one or more of steering, braking, or acceleration/deceleration of the vehicle. To be autonomous, a vehicle need not be fully automatic (for example fully operational without driver or without driver input). An autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects to the driver (e.g., braking or breaking under certain circumstances). In some aspects, autonomous vehicles may handle some or all aspects of braking, speed control, and/or a steering of the vehicle.

In the context of this disclosure, "vehicle operation data" are understood to mean any type of feature related to the operation of a vehicle, including the status of the vehicle such as the tires of the vehicle, the type of vehicle, the age of the manufacturing of the vehicle, and thus rather static vehicle operation data. However, "vehicle operation data" may also include features changing during the operation of the vehicle, such as weather conditions or road conditions during the operation of the vehicle, and thus rather varying vehicle operation data.

Throughout this disclosure, the following terms will be used as synonyms: driving parameter set, driving model parameter set, safety layer parameter set, driver assistance and/or automated driving model parameter set.

Furthermore, throughout this disclosure, the following terms will be used as synonyms: driving parameter, driving model parameter, safety layer parameter, driver assistance and/or automated driving model parameter.

Figure 2:
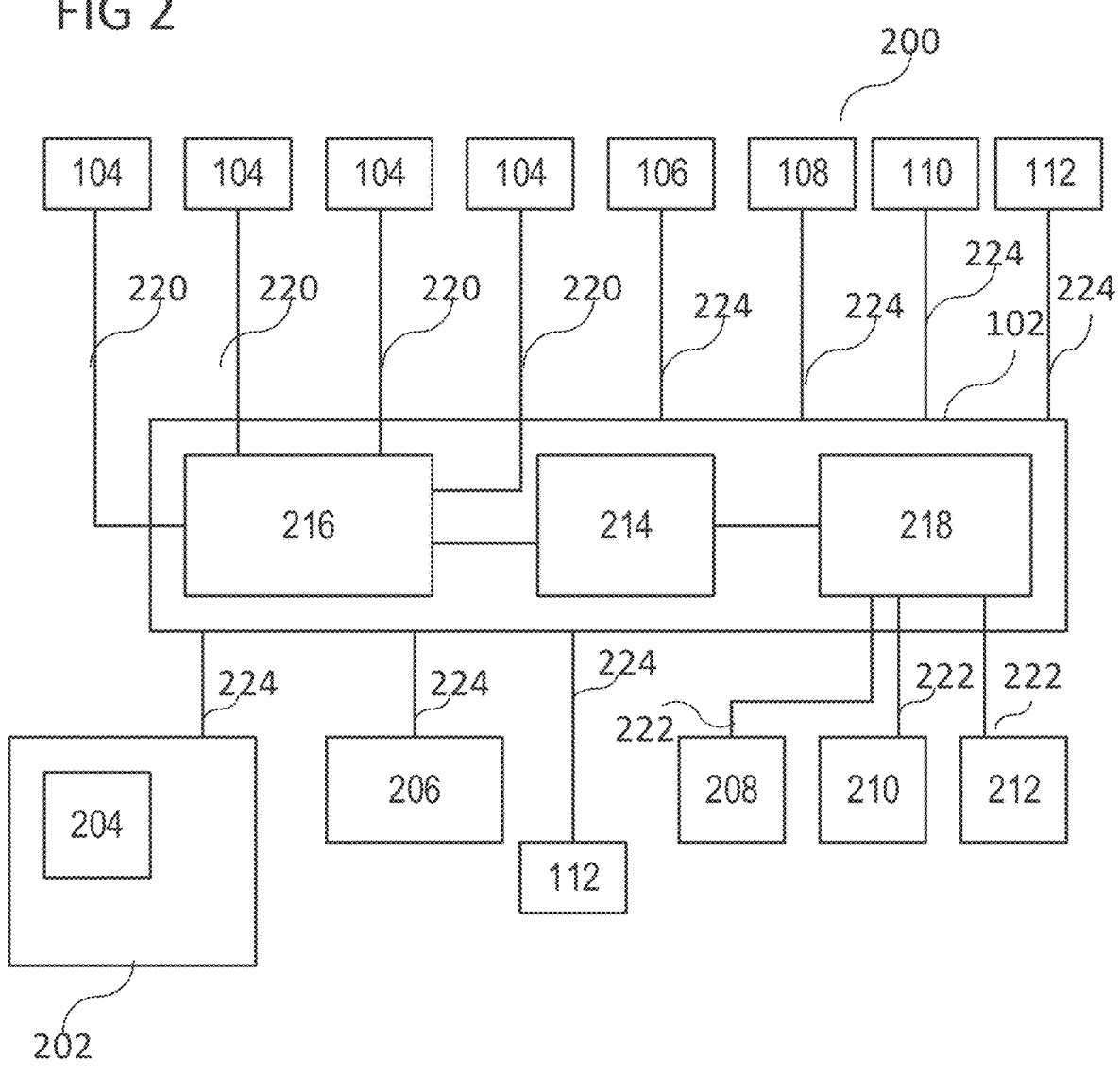
FIG. 2 shows various electronic components of a safety system of the vehicle.

FIG. 1 shows a vehicle 100 including a safety system 200 (see also FIG. 2) in accordance with various aspects of this disclosure. The safety system 200 may include various components depending on the requirements of a particular implementation. As shown in FIG. 1 and FIG. 2, the safety system 200 may include one or more processors 102, one or more image acquisition devices 104 such as e.g. one or more cameras 104, a position sensor 106 such as a Global Navigation Satellite System (GNSS), e.g. a Global Positioning System (GPS), one or more memories 202, a map database 204, one or more user interfaces 206 (such as e.g. a display, a touch screen, a microphone, a loudspeaker, one or more buttons and/or switches, and the like), and one or more wireless transceivers 208, 210, 212. The wireless transceivers 208, 210, 212 may be configured to different desired radio communication protocols or standards. By way of example, a first wireless transceiver 208 may be configured in accordance with a Short Range mobile radio communication standard such as e.g. Bluetooth, Zigbee, and the like. Furthermore, a second wireless transceiver 210 may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards. A third wireless transceiver 212 may be configured in accordance with a Wireless Local Area Network communication protocol or standard such as e.g. in accordance with IEEE 802.11 (e.g. 802.11, 802.11a, 802.11b, 802.11g, 802.11n, 802.11p, 802.11-12, 802.11ac, 802.11ad, 802.11ah, and the like). The one or more wireless transceivers 208, 210, 212 may be configured to transmit signals via an air interface.

The image capture devices 104 may each include any type of device suitable for capturing at least one image from an environment of the vehicle 100. Moreover, any number of image capture devices 104 may be used to acquire images to input to a processor such as an image processor.

The one or more processors 102 may include an application processor 214, an image processor 216, a communication processor 218, or any other suitable processing device. Similarly, image acquisition devices 104 may include any number of image acquisition devices and components depending on the requirements of a particular application. Image acquisition devices 104 may include one or more image capture devices (e.g., cameras, CCDs (charge coupling devices), or any other type of image sensor). The safety system 200 may also include a data interface communicatively connecting the one or more processors 102 to the image acquisition devices 104. For example, a first data interface may include any wired and/or wireless first link 220 or first links 220 for transmitting image data acquired by image acquisition devices 104 to the one or more processors 102, e.g. to the image processor 216.

The wireless transceivers 208, 210, 212 may be coupled to the one or more processors 102, e.g. to the communication processor 218, e.g. via a second data interface which may include any wired and/or wireless second link 222 or second links 222 for transmitting radio transmitted data acquired by wireless transceivers 208, 210, 212 to the one or more processors 102, e.g. to the communication processor 218.

The memories 202 as well as the one or more user interfaces 206 may be coupled to each of the one or more processors 102, e.g. via a third data interface which may include any wired and/or wireless third link 224 or third links 224. Furthermore, the position sensor 106 may may be coupled to each of the one or more processors 102, e.g. via the third data interface.

Such transmissions may also include communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

One or more of the transceivers 208, 210, 212 may be configured to implement one or more vehicle to everything (V2X) communication protocols.

Each processor 214, 216, 218 of the one or more processors 102 may include various types of hardware-based processing devices. By way of example, each processor 214, 216, 218 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some embodiments, each processor 214, 216, 218 may include any type of single or multi-core processor, mobile device microcontroller, central processing unit, etc. These processor designs may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when executed by a processor (e.g. by the one or more processors 102), controls the operation of the system, e.g. the safety system. A memory of the one or more memories 104 may store one or more databases and image processing software, as well as a trained system, such as a neural network, or a deep neural network, for example. The one or more memories 104 may include any number of random access memories, read only memories, flash memories, disk drives, optical storage, tape storage, removable storage and other types of storage.

In some embodiments, the safety system may further include components such as a speed sensor (e.g., a speedometer) for measuring a speed of the vehicle 200. The safety system may also include one or more accelerometers (either single axis or multiaxis) (not shown) for measuring accelerations of the vehicle 100 along one or more axes. The safety system may further include additional sensors or different sensor types such as one or more radar sensors 110, one or more LIDAR sensors 112 (which may be integrated in the head lamps of the vehicle 100), and the like. The third data interface may coupled one or more radar sensors 110 and one or more LIDAR sensors 112 to each of the one or more processors 102.

The one or more memories 202 may store data, e.g. in a database or in any different format, that e.g. indicate a location of known landmarks. The one or more processors 102 may process sensory information (such as images, radar signal, depth information from LIDAR or stereo processing of two or more images) of the environment of the vehicle 100 together with position information, such as a GPS coordinate, vehicle's ego motion, etc. to determine a current location of the vehicle 100 relative to the known landmarks, and refine the vehicle location. Certain aspects of this technology are included in a localization technology such as a mapping and routing model.

The map database 204 may include any type of database storing (digital) map data for the vehicle 100, e.g. for the safety system. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including, for example, names associated with any of the stored features. In such embodiments, a processor of the one or more processors 102 may download information from the map database 204 over a wired or wireless data connection to a communication network (e.g., over a cellular network and/or the Internet, etc.). In some cases, the map database 204 may store a sparse data model including polynomial representations of certain road features (e.g., lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers.

Furthermore, the safety system may include a driving model, e.g. implemented in an advanced driving assistance system (ADAS) and/or a driving assistance and automated driving system. By way of example, the safety system may include (e.g. as part of the driving model) a computer implementation of a formal model such as a safety driving model. A safety driving model may be or include a mathematical model formalizing an interpretation of the law which is applicable to self-driving (ground) vehicles. A safety driving model may be designed to achieve e.g. three goals: first, the interpretation of the law should be sound in the sense that it complies with how humans interpret the law. Second, the interpretation should lead to a useful driving policy, meaning it will lead to an agile driving policy rather than an overly-defensive driving which inevitably would confuse other human drivers and will block traffic and in turn limit the scalability of system deployment. Third, the interpretation should be efficiently verifiable in the sense that it can be rigorously proven that the self-driving (autonomous) vehicle implements correctly the interpretation of the law. A safety driving model illustratively may be or include a mathematical model for safety assurance that enables to identify and perform proper responses to dangerous situations such that self-perpetrated accidents can be avoided.

A safety driving model may implement logic to apply driving behavior rules such as the following five rules:

Do not hit someone from behind.

Do not cut-in recklessly.

Right-of-way is given, not taken.

Be careful of areas with limited visibility.

If you can avoid an accident without causing another one, you must do it.

It is to be noted that these rules are not limiting and not exclusive and can be amended in various aspects as desired. The rules rather represent a social driving contract that might be different depending on the region and may also develop over time. While these five rules are currently applicable in most of the countries they might not be complete and may be amended.

As described above, the vehicle 100 may include the safety system as also described with reference to FIG. 2.

The vehicle 100 may include the one or more processors 102 e.g. integrated with or separate from an engine control unit (ECU) of the vehicle 100.

The safety system may in general generate data to control or assist to control the ECU and/or other components of the vehicle 100 to directly or indirectly control the driving of the vehicle 100.

In the following, a method based on a mapping and routing model may be provided. The method may be provided for accident prevention through the mapping of harvested dangerous situation statistics as will be described in detail further below. A mapping and routing model provides a crowd-sourced mapping mechanism (e.g. using one or more digital maps and/or databases 204 stored in the one or more memories 202) using harvesting agents that aggregate static and dynamic environment data. In various aspects of this disclosure, a mapping and routing model method is provided to capture statistics of encountered dangerous situations, as defined by a safety driving model metrics. Illustratively, a heatmap layer is provided on top of a mapping and routing model representing a risk value to one or more road segments in a (digital) map. It is to be noted that the heatmap is a visualization possibility for the heatmap data. However, the heatmap data may be represented and/or process in a different format, such as in a data structure or in any other desired way. This approach allows a fine-tuning of safety driving model parameters (as an example of driving model parameters) of a respective vehicle 100 such that a more appropriate driving policy is adopted in high-risk places based on the gathered experience evidence.

Although the following aspects will be described in association with the safety driving model, any other driving model and/or other mapping mechanisms than a mapping and routing model may be provided in alternative implementations.

The one or more processors 102 of the vehicle 100 may implement the following aspects and methods.

Conventional safety system monitor approaches such as a safety driving model provide a framework for driving policies based on environment perception and internal parameters. However, a conventional safety driving model and other similar approaches do not take directly into account the past evidence on the potentially increased risk at particular points in space and time that may be triggered by unknown causes to the provided driving model. Furthermore, humans may learn from near-accident scenarios and may adopt their behavior when driving the same road for subsequent occasions. However, the experience acquired by humans cannot be easily gathered in scale for automated systems. Governments/police departments throughout the world have created and made publicly available databases of traffic accidents. This data may be used for visualization in a specific digital map which may also be referred to as a digital heatmap. In this context, it should be noted that the exclusive use of traffic accidents from databases may leave out a high number of events that may have been or were close to become an accident. This may become important for the development of automated vehicles, as the human reactions that avoided an accident cannot be expected to be the same as the reactions of a machine.

Various aspects of this disclosure may define a map layer (e.g. an additional digital map in addition to or merged with a conventional digital map) on top of the crowd sourcing approach of a mapping and routing model to gather the evidence of high-risk locations, and then may use this information to fine-tune safety driving model parameters to minimize future dangerous events.

Various aspects may provide the following combination of one or more of the following aspects:

1) an approach to detect dangerous situations based on the strict definition of a safety driving model or any other driving model;

2) an implementation of a detection algorithm in a distributed manner on all harvesting agents as proposed in a mapping and routing model;

3) a statistical approach to gather and store a crowd sourced dangerous events into a heat map layer; and 4) a tuning process to constrain the safety driving model parameters of vehicles according to their location in the road 302.

Various aspects may enable to implement an efficient way to adapt a safety system monitor based on a safety driving model or any other driving model to unknown scenarios at which the safety driving model and safety driving model parameters or any other driving model and their respective parameters were not optimized for. Various aspects may leverage real life experience knowledge to increase the road safety continuously, including not yet understood scenarios of mixed human and automated driving. The exemplary method would allow to deploy a system that self-adapts to increase safety and thus increase the customers trust in safety driving model based technologies.

Figure 3:
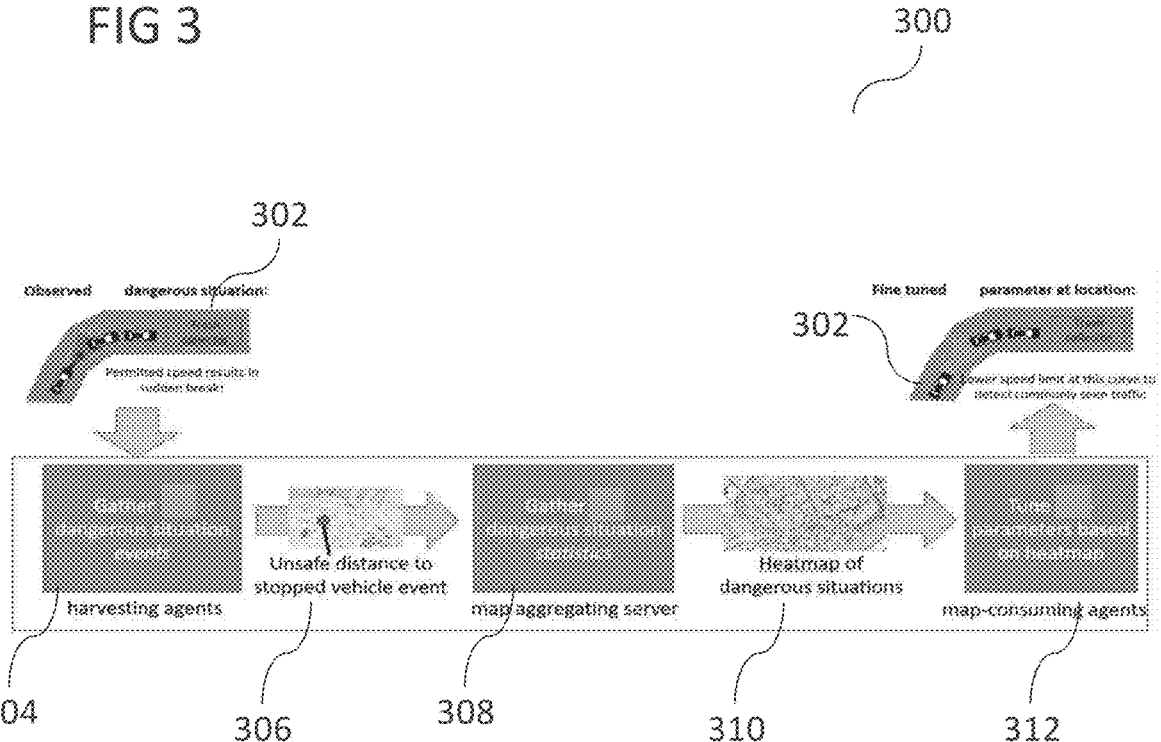
FIG. 3 shows a process of detecting dangerous situations and the creation and distribution of a server created heatmap to vehicles in accordance with various aspects of this disclosure.

As shown in process 300 of FIG. 3, in some roads 302, there exist places at which the likelihood of an accident is higher than the risk estimation based on a simple model. This could be for example due to a combination of non-ideal conditions, such as direct sunlight (either reflected from a wet surface, or from a sunset) during a curve of the road where an unexpected vehicle is perceived within a very short time.

The one or more processors 102 of the vehicle 100 may detect (based on various data detected by one or more sensors, e.g. one or more sensors as described above, e.g. by one or more cameras and/or one or more position sensors and/or one or more radar sensors and/or one or more LIDAR sensors, and the like) one or more dangerous situations which e.g. a user of the security system or a developer of the security system may predefine in a respective driving model and store the same in one or more memories 104. A safety system may detect a dangerous situation for a vehicle e.g. if one or more danger criteria are fulfilled, e.g. if one or more distance and/or speed thresholds are undershot or exceeded.

By way of example, a user of the security system or a developer of the security system may predefine the following dangerous situations in a safety driving model and the one or more processors 102 may detect them in accordance with a safety driving model:

dangerous longitudinal situation;

dangerous lateral situation;

dangerous situation as a combination of dangerous longitudinal situation and dangerous lateral situation.

Moreover, also other vehicles may detect dangerous situations during operation and may store the same in their one or more memories (block 304).

The vehicle 100 and the other vehicles may transmit the detected dangerous situations (e.g. using the one or more transceivers 208, 210, 212), in 306, to a map aggregating server 308, as will be described in more detail below. The map aggregating server 308 may collect the dangerous situations received by the vehicle 100 and the other vehicles (in other words by the harvesting agents) and may create a dynamic safety map layer (such as e.g. a heatmap layer, in other words, a dynamic layer including metadata associated with safety/risk—the safety map layer may be implemented in any desired format and such in any desired data structure, for example) including the dangerous situations assigned to respective road segments at which the respective dangerous situations occurred. Then, the map aggregating server 308 may transmit the created safety map layer (in other words safety metadata such as a heatmap layer, e.g. a heatmap) to the vehicle 100 and the other vehicles, in 310, which may then adjust their safety driving model parameters in accordance with the received heatmap and the danger information included therein (block 312).

Figure 4:
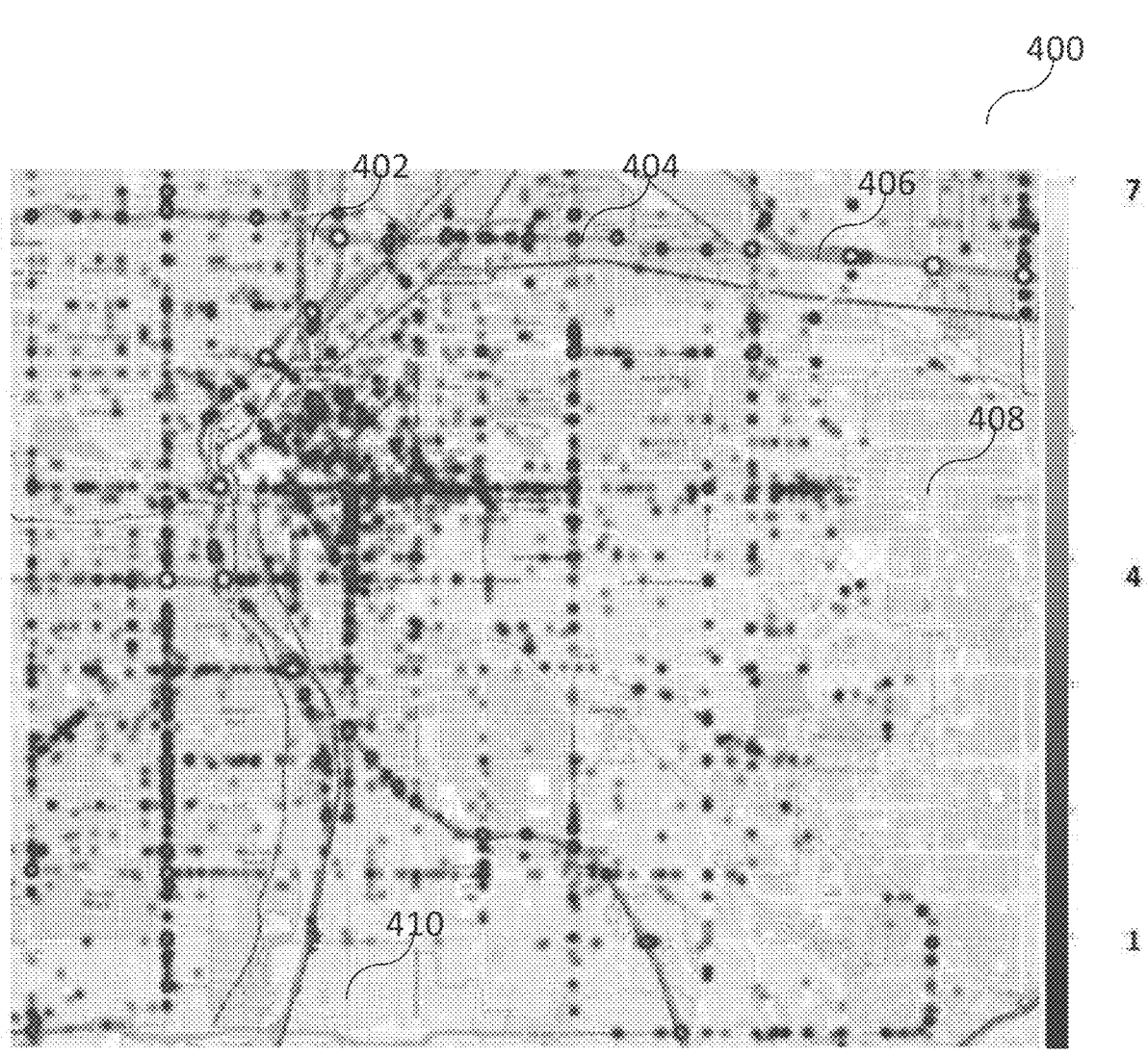
FIG. 4 shows an example of an accident heatmap.

The one or more processors 102 may merge the created dynamic safety map layer with or at least consider it together with accident metadata (in other words, accident map layer (e.g. in a format of an accident heatmap 400) as shown in FIG. 4 including previous accidents in the road segments of the map. As described above, accident metadata (in other words, accident map layer (e.g. in a format of an accident heatmap 400) provide a recorded evidence of physical locations with high risk. For example, FIG. 4 shows spots 402, 404, 406, 408, 410, in the city of Denver, where more accidents tend to occur.

By following a mapping and routing model like approach to collect dangerous situations collected at runtime by harvesting agents (which are implemented in the vehicles such as in the vehicle 100), it is provided to create a dynamic danger map that contains the information of places (e.g. road segments, in general regions) that are more propene to accidents even before they manifest. Furthermore, it allows to close a feedback loop and provide vehicles with this information at real-time to reduce the chances of such an accident.

To detect dangerous situations, a driving model such as a safety driving model may be implemented on a fleet of harvesting agents (in a plurality of vehicles) and communicate this to a server 308, e.g. a cloud server 308 (e.g. the map aggregation server 308) which is as such provided in a mapping and routing model, for example. The server 308, e.g. the cloud server 308, may aggregate the detected dangerous situations (and possible "events" determined from the detected dangerous situations) into a digital map as a digital dynamic safety map layer or map metadata including the dangerous situations assigned to the region(s) at which a dangerous situation occurred. The safety system may then provide the vehicle 100 with the created dynamic heatmap or with portion of the created dynamic safety map layer or map metadata that is relevant to their location to influence a safer driving, e.g., by adapting local safety driving model parameters to a more cautious behavior of the driving model.

FIG. 5 shows an exemplary mapping 500 of algorithms 502, acting entities 504 and physical components 506 of various aspects of this disclosure.

The exemplary mapping provides the following acting entities 504 as e.g. defined by a mapping and routing model:

one or more harvesting agents 508;

one or more safety map layer or map metadata servers (e.g. one or more heatmap aggregating servers 308); and one or more safety map layer or map metadata consuming agents (e.g. one or more heatmap consuming agents 510).

Furthermore, the exemplary mapping provides for the following mappings of algorithms as e.g. defined by a mapping and routing model:

The one or more harvesting agents 508 may be configured to implement e.g. one or more or all of the following algorithms:

a dangerous situation detection algorithm 512 in accordance with a driving model, e.g. in accordance with a safety driving model; and/or an algorithm 514 to extract an event associated to a respective dangerous situation.

The one or more safety map layer or map metadata (e.g. heatmap) consuming agents 510 may be configured to implement e.g. an algorithm 516 to adapt the local safety driving model parameters based on received dynamic safety map layer or map metadata (e.g. heatmap).

The one or more safety map layer or map metadata (e.g. heatmap) aggregating servers 308 may be configured to implement e.g. one or more or all of the following algorithms:

an algorithm 518 to receive dangerous situations and/or dangerous events and update the dynamic safety map layer or map metadata (e.g. heatmap) accordingly; and/or a maintenance process 520 to manage the time life of events in the heatmap; and/or a transmission process 522 to distribute a relevant subset of the safety map layer or map metadata (e.g. heatmap) to the harvesting agents, e.g. to one or more vehicles such as the vehicle 100.

The physical components 506 may include:

one or more vehicles 100;

one or more cameras such as the cameras 104 mounted on the vehicles 100 or cameras of the traffic infrastructure; and/or one or more communication antennas which may be part of the one or more transceivers 208, 210, 212 of the vehicles 100 or one or more communication antennas of the traffic infrastructure; and/or one or more processor nodes 524 which may be part of the traffic infrastructure.

The one or more harvesting agents 508, the one or more safety map layer or map metadata (e.g. heatmap) aggregating servers 308, and the one or more safety map layer or map metadata (e.g. heatmap) consuming agents 510 may be communicatively coupled via a communication link 526.

The one or more safety map layer or map metadata (e.g. heatmap) aggregating servers 308 may be located and be part of a cloud 528, which may be coupled to cloud communication antennas 530 and further cloud processor nodes 532.

In the following, a more detailed explanation is provided for various algorithms.

Figure 6:
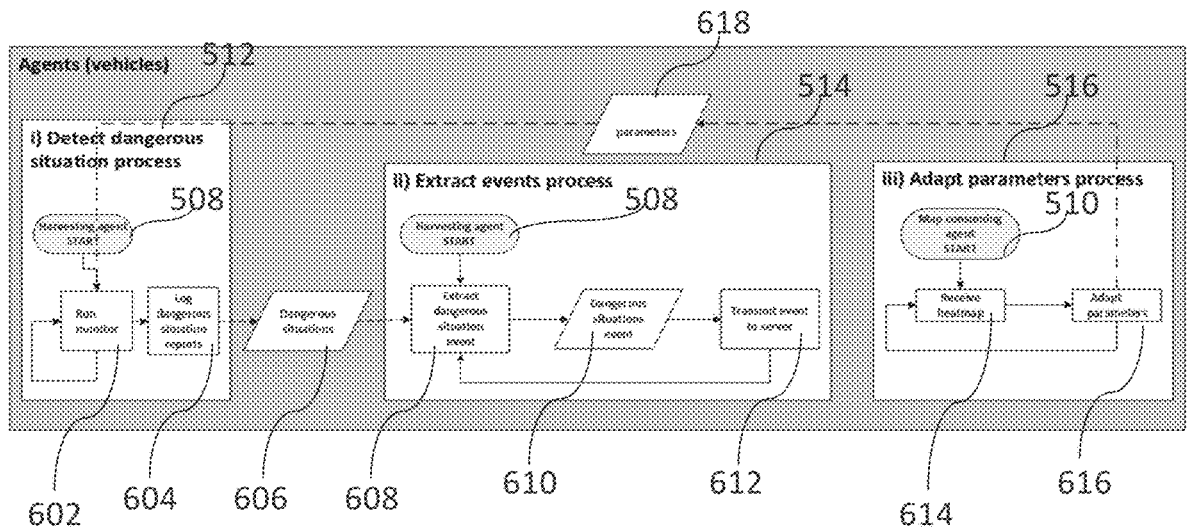
FIG. 6 shows how algorithms running in the assistance driving model implemented by the vehicle side for detecting dangerous vents and adapting assistance driving model parameters are related to each other.

FIG. 6 shows how the three algorithms running in the driving model implemented by the vehicles, such as the vehicle 100, for detecting dangerous vents and adapting assistance driving model (e.g. safety driving model) parameters are related to each other. Illustratively, in the agent processes—vehicles crowd-source dangerous situations as they experience them through e.g. a safety driving model, and transmit them to a server 308 (e.g. the heatmap aggregation server 308) e.g. through a mapping and routing model or any other suitable communication connection. The server 308 then may inform vehicles with information about previous experiences that can be used to adapt the driving model parameters, e.g. safety driving model parameters, for continuous learning.

The one or more processors 102 may implement (e.g. perform) the dangerous situation detection algorithm 512 in accordance with a driving model, e.g. in accordance with a safety driving model, as follows:

The dangerous situation detection algorithm algorithm 512 is based on the execution of a safety driving model on the vehicle 100 during operation. The dangerous situation detection algorithm algorithm 512 may include to monitor and detect whenever a safety driving model identifies a dangerous situation. For example, a running instance 602 of an implementation of the safety driving model may detect that a particular time t is "longitudinally dangerous" as the distance between two vehicles is not safe in accordance with a respective driving model such as a safety driving model. The dangerous situation detection algorithm algorithm 512 may further include logging a detected dangerous situation, in 604. The one or more processors 102 may supply one or more detected logged dangerous situations in a dangerous situation data message 606 to the algorithm 514 to extract an event associated to a respective dangerous situation.

By way of example, the one or more processors 102 may implement a safety driving model runtime monitor and may gather safety driving model dangerous situation reports covering a subset or all dangerous situations defined in the safety driving model as respective one or more dangerous situation data messages 606. Each dangerous situation report is stored with (in other words, each dangerous situation data message 606 may include):

a) a timestamp T, b) a physical location L, c) a class id of the dangerous situation I, d) safety driving model response R, and optionally e) metadata M for extensions, e.g. for a more granular description of the event.

The timestamp T may indicate a temporal scale of decades and a resolution of milliseconds. The physical location L may specify the point in space in three dimensions with a configurable resolution/accuracy, varying from centimeters to a few meters. The possible values of the class of the situation I is defined by the set of dangerous situations defined in the safety driving model, e.g.: {"dangerous longitudinal situation", "dangerous lateral situation", "dangerous situation", . . . }. The safety driving model Response R may convey the information on the action taken in response to the respective dangerous situation and may be defined as the set of possible actions as defined e.g. in the safety driving model. Metadata M may define a field of variable length that may convey text, safety state (accident, no accident), authentication and security tokens, etc.

A possible message format of the dangerous situation data message 606 is shown in Table 1:

In an optional subsequent process, a processor may fuse and/or filter and/or compress the gathered dangerous situation reports.

The one or more processors 102 may implement (e.g. perform) the algorithm 514 to extract an event associated to a respective dangerous situation, e.g. as follows:

The algorithm 514 receives a one or more dangerous situation data messages 606. As the number of dangerous situations can be correlated to the same root-cause, it may be provided to pre-process them to identify a triggering event place in space and in time, its lifetime and criticality. This process may then compress the observed dangerous situations to a single event to be transmitted.

By way of example, if a vehicle (e.g. vehicle 100) must suddenly break due to the violation of a safety distance, one or more processors 102 may continuously report the dangerous situation for the period of time during which the safety distance was still not achieved. The one or more processors 102 may compress this series of reported dangerous situations into a single event of a safety distance violation starting at some point in time, with a certain time duration and with a certain criticality according to the triggered response and final state.

The one or more processors 102 may compress the safety driving model dangerous situation reports into one or more single events (in 608) with an associated id, start, duration, and a criticality metric and may thus generate a dangerous situation event message 610. The start T and duration D of the event may be defined as the physical and temporal coordinates at which a set of correlated dangerous situation reports have been detected to start and to end respectively. A criticality metric C may be a subjective measure of the event severity and may be defined as a function $C: X \rightarrow [0,1]$, where X describes the following parameters:

a) the dangerous situation duration (short, long), b) the strength of the safety driving model response (full deceleration, or smooth), and c) the end state (accident or no accident).

A possible message format of the dangerous situation event message 610 is shown in Table 2:

TABLE 1

| Log format of a single dangerous situation data message 606 | | | | |
|---|---|---|---|---|
| Timestamp T {e.g. 2018.08.10 23:14.00} | Physical location T {e.g. Latitude: 55, Longitude: 75, Altitude: 500} | Situation Class id I {e.g. "longitudinally dangerous"} | Safety driving model response R {e.g. max break} | Metadata M {e.g. "Message Authentication Code", "no accident"} |

TABLE 2

| Log format of a single dangerous situation event message 610 | | | |
|---|---|---|---|
| Class id I {e.g. "longitudinally dangerous"} | Start T {e.g. (2019.10.31 11:26.15), (LON: −74.0059731, LAT: 40.7143528, ALT: 9)} | Duration D {e.g. (2019.10.31 11:26.17) (LON: −74.00612283, LAT: 40.71425021, ALT: 9)} | Criticality C {e.g. 0.8 (representing a highly dangerous situation close to a sever accident)} |

To fuse dangerous situation reports into a single event, a processor may search the database of reports for continuous reports of the same class id, i.e., reports which form an uninterrupted sequence in their timestamps of the same report type. The maximum value of the safety driving model response in the sequence may be used for the computation of the criticality C.

A possible implementation of the criticality function C could be the following:

---

Pseudocode of an implementation of criticality function C

```
Inputs: End_State, Safety_Driving_Model_Response, Duration
Output: C
If(End_State == ACCIDENT):
    C=1
Else:
If(Safety_Driving_Model_Response == MAX_ACCELERATION):
C=0.9
```

---

-continued

---

Pseudocode of an implementation of criticality function C

```
Else:
    If(Duration > 1 sec):
        C=0.7
Else:
        C=0.2
```

---

The one or more harvesting agents 508 may then send one or more dangerous situation event messages 610 to the heatmap aggregating server 308, as shown in 612.

The one or more processors 102 may implement (e.g. perform) the algorithm 516 to adapt the local safety driving model parameters based on the received dynamic heatmap.

This process is the last in the end-to-end system logically speaking. The processes performed by the map aggregating server 308, in other words of the Cloud actor are precedent to it. This process receives, in 614, as an input a full dynamic heatmap or a subset of the dynamic heatmap aggregated at the map aggregating server 308 and may adapt the local safety driving model parameters accordingly in 616.

The tuples of dangerous situation events received for each grid point contain a summary of the number of incidents and average criticality for each dangerous situation class.

In this process, the one or more processors 102 may adapt the safety driving model parameters related to each situation class in 618.

Illustratively, a method to constrain the value or safety driving model parameters as a function of the 'temperature' tuples on the received heatmap gridpoints may be provided. For each class of dangerous situation I, a function Z is defined to constraint the possible values of a subset of related safety driving model parameters P.

For example, to avoid to re-encounter a "dangerous longitudinal situation" event marked to happen regularly at a road position where the vehicle 100 is approaching (and marked for the current time range), this process could decrease the maximum acceleration parameter to force an earlier break reaction.

A possible implementation of a constraining function Z could be the following:

---

Pseudocode of an implementation of a constraining function Z

```
Inputs: I="longitudinally dangerous", N, A
Parameters: CRITICALITY_THRESHOLD, INSTANCES_THRESHOLD,
REDUCTION_FACTOR
Output: P: {max_acceleration}
If(A > CRITICALITY_THRESHOLD):
    If(N < INSTANCES_THRESHOLD):
        Exit
    Else:
        max_acceleration = max_acceleration * REDUCTION_FACTOR
Else:
    Exit
```

---

Figure 7:
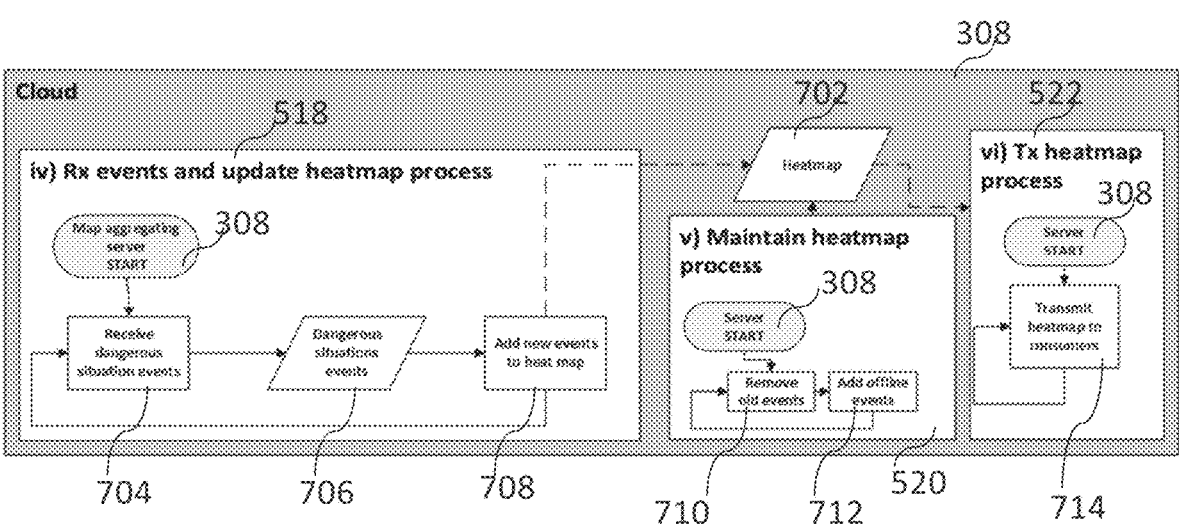
FIG. 7 shows exemplary processes related to creating, maintaining and transmitting a heatmap of dangerous situations observed in accordance with various aspects of this disclosure.

FIG. 7 shows exemplary processes related to creating, maintaining and transmitting a dynamic heatmap 702 (which is an exemplary implementation of a digital risk map) of dangerous situations observed in accordance with various aspects of this disclosure. In the server processes, the one or more heatmap aggregating servers 308 may transform the received dangerous events from the harvesting agents 508 into a dynamic heatmap 702 that captures dangerous situations, not just accidents, and transmits this information to vehicles to improve their safety-critical decisions.

The one or more heatmap aggregating servers 308 may implement (e.g. perform) the algorithm 518 to receive dangerous situations and/or dangerous events and update the dynamic heatmap accordingly.

In 704, the cloud server (e.g. the one or more heatmap aggregating servers 308) receives the dangerous situation events message 610 from some or all harvesting agents 508, and stores them in a heatmap database that represents the new layer of dangerous situations. The dynamic heatmap 702 may include or essentially consist of a 3D space grid with associated "temperature" values at each point in space. The temperature may indicate the number and criticality of dangerous situations encountered throughout a large time span defined by a threshold parameter Tr.

Illustratively, the one or more heatmap aggregating servers 308 may, in 706, associate to each point in a space-time grid, corresponding to a physical road, a temperature value. A temperature value may be defined as a vector of tuples (I, T, D, C), where I stands for a class id of a dangerous situation. T and D stand for the start and end timestamps and physical locations of the dangerous situation event. C stands for a criticality metric. The grid has a parameterizable resolution defined by deltaS, which define the spatial granularity for aggregating and indexing events. By way of example, the resolution of the grid of the dynamic heatmap 702 may be in the range from about 1 m to about 50 m in the physical region represented by the dynamic heatmap 702. In 708, the process may include to amend the dynamic heatmap 702 by the respective dangerous situation event received in the dangerous situation events messages 610.

FIG. 8 shows an exemplary dynamic heatmap 702 in accordance with various aspects of this disclosure.

At each grid point 802, an event vector 804 stores the observed dangerous situation events by the crowd. Each event vector 804 contains the situation id, a start and end time stamp/location and a criticality metric. Vehicles passing by, may receive a subset of the grid that is relevant (near) for their current position.

Within a grid point 802, the event vector 804 (also referred to as tuple) contains more precise information of the event place, and thus the spatial resolution is not lost. Grid points 802, however, are useful for efficiently storing events to quickly retrieve them by a physical proximity index. In this process, the received dangerous situation events are stored with the indices i, j and k according to their start parameter T, such that dangerous situation events with a starting location (x,y,z) located within the coverage of a grid area point are stored together in the same event vector 804.

The one or more heatmap aggregating servers 308 may implement (e.g. perform) the maintenance process 520 to manage the time life of events in the dynamic heatmap 702.

Referring back to FIG. 7, this process 520, in 710, cleans the dynamic heatmap 702 from old events that may no longer be relevant. The process may optionally remove events older than a predefined time threshold Tr. Furthermore, the process may integrate accident recordings received from other databases by adapting the information data to the dynamic heatmap 702 format accordingly in 712.

The one or more heatmap aggregating servers 308 may implement (e.g. perform) the transmission process 522 to distribute the relevant subset of the heatmap 702 to the harvesting agents, e.g. to one or more vehicles such as the vehicle 100.

The one or more heatmap aggregating servers 308 may transmit the full dynamic heatmap 702 or one or more relevant subsets of the dynamic heatmap 702 to passing by vehicles in 714. To reduce the amount of information to be transmitted, the instances of event tuples at the points of interest can be accumulated together, so that the vehicle (e.g. the vehicle 100) receives a single tuple per grid point and class id of the dangerous situation, the total number of instances, and an average of their criticality, if their timestamp is close to the current point in time. This may reduce a heatmap including or essentially consisting of an event vector of tuples for each grid point 802 of the same class id I to a dynamic heatmap 702 containing a single tuple for each point and each class id.

The resulting tuple for each class id may be defined with the following elements:

a) class id I, b) total number of events N detected at grid point area, and c) average criticality A.

A possible format of the tuple is shown in Table 3:

TABLE 3

| Tuple summarizing events of the same class used for transmission to vehicles | | |
|---|---|---|
| Class id I {e.g. "longitudinally dangerous"} | Number of events N {e.g. 5} | Average criticality A {e.g. C = 1.2} |

Illustratively, the transmission process 522 may include transmitting e.g. a subset of the dynamic heatmap 702 according to the location of the target agent, such that the received heatmap only covers a locally reachable region within a defined time window.

The reachable region of vehicles may be implemented in two ways:

a) independently of the presence of vehicles, and b) customized for each vehicle.

In case (a), a roadside unit would continuously broadcast the dynamic heatmap 702 grid points 802 within a predefined region.

In case (b), a unicast or multicast transmission can be dedicated to each vehicle. The transmitted dynamic heatmap 702 grid points 802 will depend on the reported vehicle position and speed.

FIG. 9 shows a method 900 of operating a safety system for a vehicle.

The method 900 may include, in 902, detecting vehicle operation data during operation of the vehicle, in 904, determining one or more dangerous situations using the vehicle operation data in accordance with a predefined driving policy, in 906, classifying the one or more dangerous situations into one or more predefined situation classes, and, in 908, generating a situation report message including information about the one or more classified situation classes associated with a time information indicating at which time a respective classified situation class occurred and with a location information indicating at which location a respective classified situation class occurred. The situation report message may further include safety system parameters in effect during the dangerous situation and any other vehicle parameters that might impact actuation, as well as other vehicle's observed variables (e.g. position, velocity and safety parameters derived from observation or from wireless communication).

FIG. 10 shows a method 1000 operating a safety system server.

The method 1000 may include, in 1002, receiving at least one situation report message including information about one or more classified situation classes associated with a time information indicating at which time a respective classified situation class and with a location information indicating at which location a respective classified situation class occurred at a vehicle, and, in 1004, generating or updating a digital risk map including one or more regions in which one or more probabilities of one or more dangerous situations is indicated based on the received at least one situation report message, wherein one probability is assigned to one respective dangerous situation. The situation report message may further include safety system parameters in effect during the dangerous situation and any other vehicle parameters that might impact actuation, as well as other vehicle's observed variables (e.g. position, velocity and safety parameters derived from observation or from wireless communication).

In the following, online safety driving model parameter updates via infrastructure and digital map or via any other means such as vehicle passenger input (manual input or speech input, and the like) will be described in detail.

As already described above, a great challenge for automated driving (AD) is to ensure that AD vehicles are safe, i.e. do not cause accidents or collisions. For this purpose, the formal mathematical safety driving model should assure a collision free traffic flow.

In a conventional safety driving model, worst-case parameters should be assumed covering all traffic participants and traffic conditions (i.e. traffic density, traffic situation, weather conditions, etc.) to guarantee the promised safety. For example, the parameters for maximum acceleration and braking need to respect both, old cars with weaker brakes and engines, as well as new, high-performance vehicles with stronger engines and brakes. Furthermore, the road surface conditions, and in principle also the weather conditions should influence the driving model parameter set of the provided driving model, and hence should be considered. Consequently, if only a single driving model parameter set is used to cover all possible circumstances, the resulting driving behavior is very conservative and requires enormous safety margins, if a single driving model parameter set is used for all conditions.

To overcome this issue, and make safety systems including a driving model such as a safety driving model more usable in real world, various aspects provide to use multiple (a plurality of) driving parameter sets, to dynamically adapt to changing road/weather/traffic situations, similar to dynamic speed limits. A safety system is provided to perform (in other words allow) parameter adaptations. The choice or selection of the appropriate driving parameter set for a specific situation can be either performed using only in-vehicle sensor information, through the infrastructure, and/or through a digital map and related digital map update, possibly also considering the dynamic heatmap 702 as described above.

Figure 11:
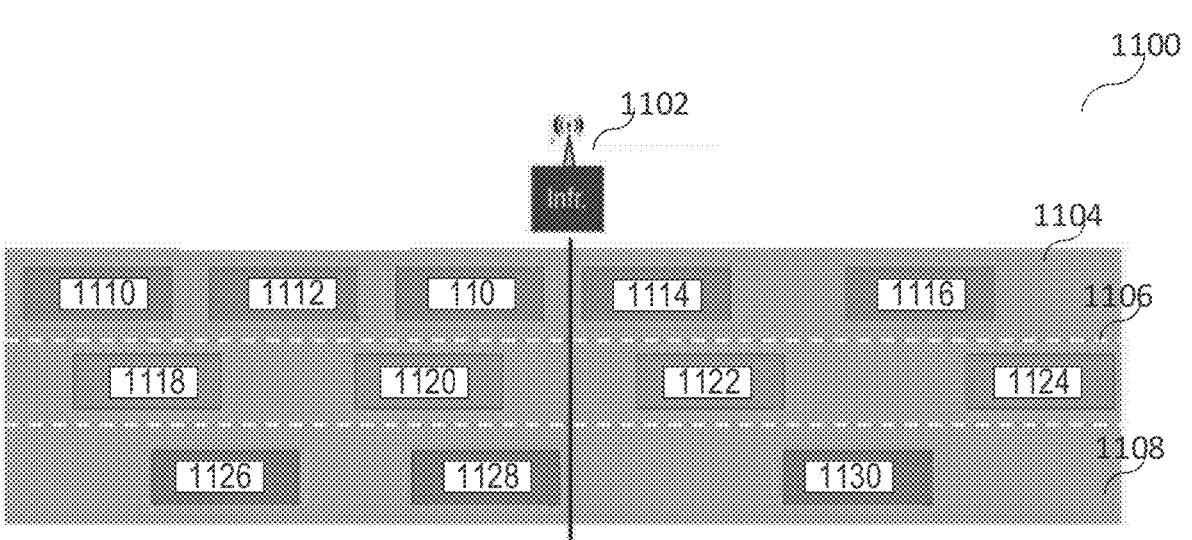
FIG. 11 shows an illustration of safety driving model parameters distributed via an infrastructure transmitter.

FIG. 11 shows an illustration 1100 of safety driving model parameters distributed via an infrastructure transmitter or transceiver 1102 to increase safety margins, and usage of different lanes depending on vehicle capabilities (in FIG. 11, it is assumed that all vehicles drive from left to right). FIG. 11 shows three lanes, e.g. a first (upmost) lane 1104, a second (middle) lane 1106, and a third (downmost) lane 1108. The lanes 1104, 1106, 1108 can be lanes of a highway, a state street, a federal street, and the like.

It may be provided to use different safety driving model parameters for different (e.g. highway) lanes 1104, 1106, 1108, to improve the overall traffic flow. For example, similar to conventional priority lanes, one lane may be reserved for vehicles without an implemented safety driving model (for example the third lane 1108), another lane for vehicles that require more conservative parameters (for example the second lane 1106), and another lane for vehicles with more aggressive parameters (for example the first lane 1104). This mechanism allows to group vehicles with similar driving characteristics, and hence may avoid unnecessary long safety margins. The assignment of vehicles to respective lanes 1104, 1106, 1108 can e.g. be done through signs, or also automatically by the infrastructure, e.g. via the infrastructure transmitter or transceiver 1102, which may negotiate with the vehicle (e.g. the vehicle 100) the proper driving parameter set and lane choice.

Various aspects may provide one or more of the following extensions to a safety system implementing a driving model such as a safety driving model:

Using the driving model such as a safety driving model with changing driving model parameter sets, instead of using a fixed (standard) driving model parameter set for all driving conditions.

A safety system illustrating how driving model parameters such as safety driving model parameters can be provided if there is not a fixed, hard-coded driving model parameter set. The origin for the different driving model parameters can be vehicle passengers, a digital map and/or infrastructure (vehicle-to-infrastructure (V2I) communication).

A safety system illustrating how driving model parameter such as safety driving model parameters can be changed at runtime.

Various aspects provide for a platooning system to group (platoon) vehicles with similar configurations to improve traffic flow.

To enhance the usability of a driving model such as a safety driving model, various aspect provide to use multiple driving model parameter sets to be able to optimize the driving experience depending e.g. on road, traffic and/or weather conditions, e.g. by choosing the most appropriate driving model parameter set for a respective current situation. The more appropriate driving model parameter set can either be hold in-vehicle and selected based on situation demand, or can be provided through infrastructure or through digital map updates (like the mapping and routing model mechanism as described above).

The safety driving model may use mathematical equations to calculate longitudinal and lateral safety distances between the ego vehicle (e.g. vehicle 100) and any other traffic participant (e.g. further vehicles 1110, 1112, 1114, 1116, 1118, 1120, 1122, 1124, 1126, 1128, 1130) considering min/max accelerations, braking forces, current speeds and reaction times. For example, the longitudinal safety margin between two vehicles is defined as follows:

$$d_{min} = \left[ v_r \rho + \frac{1}{2} a_{max,accel} \rho^2 + \frac{(v_r + \rho a_{max,accel})^2}{2 a_{min,brake}} - \frac{v_f^2}{2 a_{max,brake}} \right]_+$$

In this regard, $d_{min}$ is the longitudinal safe distance between the two vehicles, i.e. the distance that ensures that a rear vehicle can brake at least with $a_{min,brake}$ after accelerating for $\rho$ seconds with $a_{max,accel}$ (given a current speed of $v_r$ of the rear vehicle), in case a front vehicle brakes with $a_{max,brake}$ (given a current speed of $v_f$ of the front vehicle).

As mentioned above, there are plenty of parameters involved in this equation:

$a_{min,brake}$: Minimum braking force [m/s$^2$], $a_{max,brake}$: Maximum braking force [m/s$^2$], $a_{max,accel}$: Maximum acceleration [m/s$^2$], and $\rho$: Reaction time in seconds.

To guarantee that a vehicle (e.g. the vehicle 100) always remains safe, these parameters should be selected very conservatively. For example, while a Bugatti Veyron can achieve a maximum deceleration of 14 m/s$^2$, most vehicles can only achieve around 9 m/s$^2$ to 10 m/s$^2$. Similarly, a modern sports car can accelerate with more than 10 m/s$^2$, where most other vehicles and in most conditions the acceleration values are much lower. A similar argumentation holds for different road and weather conditions. Hence, to cope with all possible vehicles and circumstances, the maximum braking acceleration has to be chosen to match the maximum among all available vehicles, similar the maximum acceleration. This, however, leads to excessive safety margins (see the equation above).

To overcome this issue of a conventional driving model such as a safety driving model, various aspects may provide one or more of the following extensions to a conventional driving model such as a safety driving model:

Usage of multiple driving model parameter sets, among which the best one for each situation should be chosen.

The choice of the best driving model parameter set may be triggered through digital map data or through the infrastructure.

On roads, e.g. highways, with multiple lanes, various aspects provide for different driving model parameter settings for each lane, to combine vehicles with similar driving characteristics, and thus improve the overall traffic flow.

Two of the extensions will be described in more detail below:

Usage of Multiple Safety Driving Model Parameter Sets

In order to support the use of multiple driving model parameter sets, e.g. a safety driving model itself does not need to be modified. The only requirement is, that the overall safety driving system is capable of switching from one safety driving model parameter set to another one. Therefore, an extension of the safety driving system is required, which is explained next.

Figure 12A:
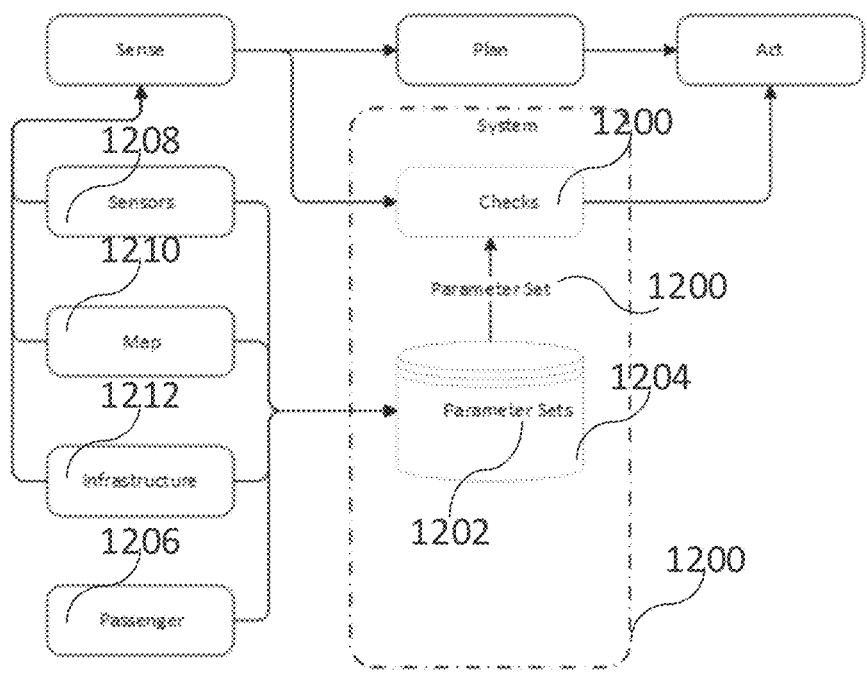
FIGS. 12A and 12B show illustrations of safety driving model systems with a driving model parameter set database.
Figure 12B:
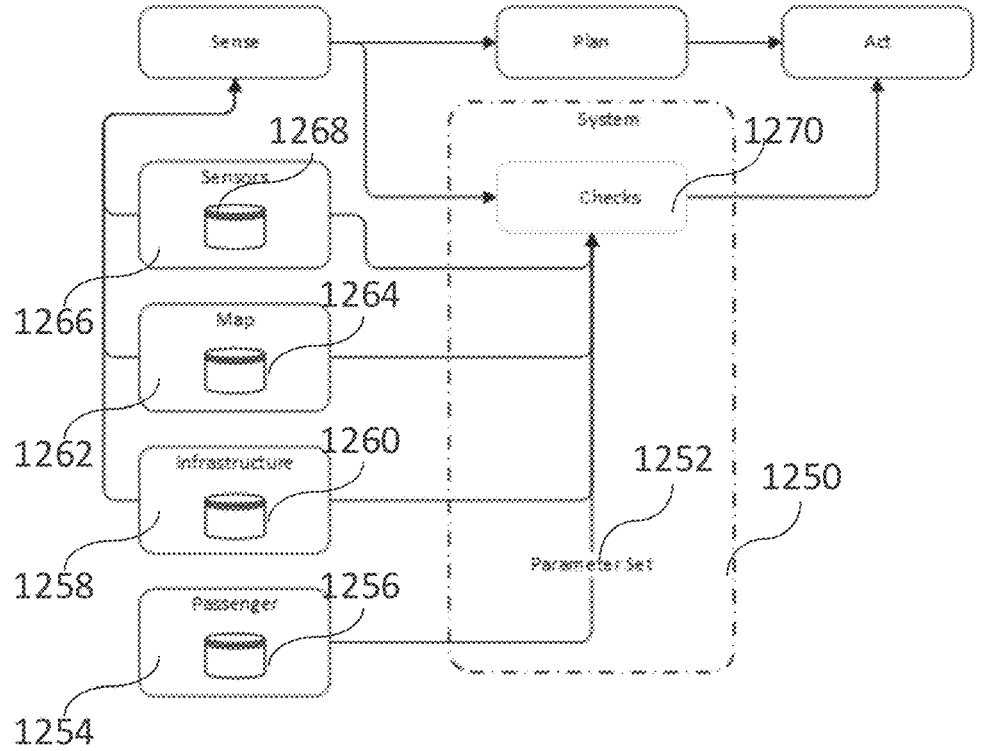

The source of the different driving model parameter sets will now be addressed. FIGS. 12A and 12B show illustrations of safety driving systems with driving model parameter set database. In general, there are two options:

Option 1) As shown in FIG. 12A, a first enhanced safety driving system 1200 may already contain multiple driving model parameter sets 1202 (which may e.g. be stored in a memory 202 of the one or more memories 202, e.g. in a database 1204), e.g. for comfort and sport driving profiles, for dry and wet conditions, etc. Then, based on some external input, the driving model such as the safety driving system may select the corresponding driving model parameter set. This input may come from the passenger 1206 (comfort, sport), from vehicle sensors 1208 (dry, wet), from an high definition (HD) digital map 1210 for automated driving (urban, highway), or even from the infrastructure 1212. In this case, the safety driving system may provide an additional database (e.g. the database 1204) to hold all driving model parameter sets 1202, and corresponding selector events.

Option 2) As shown in FIG. 12B, in a second enhanced safety driving system 1250 the driving model parameter set 1252 can be provided directly from an external input to the safety driving system. In this case, no database inside the vehicle's safety driving system may be required. Instead, all driving model parameters are provided directly. However, the database may then be used inside the parameter provider (for example passengers 1254 using passenger database 1256, infrastructure 1258 using infrastructure database 1260, digital map 1262 using map database 1264, vehicle sensors 1266 using vehicle sensor database 1268, or dynamic heatmap using dynamic heatmap database, etc.). In this option, a safety driving model checker 1270 is configured to check the admissibility of the respectively provided safety driving model parameters of a respective safety driving model parameter set 1252.

It is to be noted that both above options 1) and 2) can be implemented and used together, e.g. by one or more of the further cloud processor nodes 532.

Safety Driving Model Parameter Selection Via In-Vehicle Information, Map or Infrastructure Having an extended safety driving system 1200 or 1250 as described above, the external input source is defined be it to provide the database selector, or to provide the complete safety driving model parameter set directly.

Besides using inputs from the vehicle passengers or vehicle sensors, it is also possible to infer this information from a digital (e.g. HD) map for automated driving or through a V2X interface from the infrastructure.

In-vehicle: Assuming that the safety driving system contains multiple safety driving model parameter sets 1202, a selection can be done through sensor 1208 or passenger 1206 information. If a sensor 1208 detects a change of track conditions, for example as it starts raining, a processor of the one or more processors 102 may initiate a change to an appropriate safety driving model parameter set. Similarly, a passenger 1206 can be able to change for example from a comfort to a sporty safety driving model parameter set or vice versa as the passenger 1206 feels for example uncomfortable with driving too close to other vehicles.

HD Map 1210: For each road segment in the HD map 1210, safety driving model parameters and/or database selectors can be provided. These safety driving model parameters can also change dependent on day time, and may also change with each map update (for services such as a mapping and routing model). A processor of the one or more processors 102 may perform this process.

Infrastructure 1212: The road side infrastructure 1212 can send the selectors or safety driving model parameters directly through a V2X interface to the vehicle (e.g. to the vehicle 100). This is the most flexible solution, as parameters or selectors can be updated dynamically to react immediately on changing weather or traffic conditions, or to control the traffic in a desired way.

In all cases, a challenge is that the parameter selection should never violate the safety guarantee. For example, changing from comfort to a sport profile may affect the minimum braking acceleration. This is valid as long as it affects only the parameter of the ego vehicle, but not the minimum braking acceleration of other traffic participants.

Therefore, predefined driving model parameter sets such as predefined safety driving model parameter sets may be provided. An authorized instance such as e.g. a vehicle manufacturer or a driving model developer may verify that the predefined driving model parameter sets such as predefined safety driving parameter sets do not violate any safety regulations. Thus, it would be ensured that, when changing a driving model parameter set, it is ensured that the new driving model parameter set is feasible. This means on the one hand, that the ego vehicle (e.g. the vehicle 100) is physically capable of applying these, but also that the surrounding traffic is covered by these parameters of the respectively selected driving model parameter set from the plurality of predefined driving model parameter sets.

To address this point, in case no authorized instance is provided, a negotiation may be applied, e.g. if the infrastructure provides the driving model parameter set. Therefore, the infrastructure sends a proposal, and the vehicle (e.g. a processor of the one or more processors 102 of the vehicle 100) checks if this driving model parameter set is feasible. If yes, an "OK" signal is sent back from the vehicle to the infrastructure, e.g. to the infrastructure e.g. via the infrastructure transceiver 1102. Otherwise, a "Not-OK" signal is sent from the processor to the infrastructure e.g. via the infrastructure transceiver 1102, which then may in turn send a driving model fallback parameter set. This may have the consequence, that all vehicles in the affected road segment then may be provided with updated driving model parameters to match this driving model fallback parameter set. In case the map provides the driving model parameter set, then only vehicles then can apply these driving model parameters are allowed to use the corresponding roads. All others would have to use alternative roads.

In case of involved communication and negotiations, the latencies of these processes should be taken into consideration. That is in this case, that the respective vehicle selects and uses a conservative driving model parameter set until the negotiation is finished. To reduce latencies it may be desirable to use option 1) as described above.

Another point to take into consideration is that the options 1) and 2) mentioned above are not exclusive. This means that they can be used together, to strengthen the driving model parameter selection process. For example, map updates may be too slow to immediate changes, for which in-vehicle sensors or infrastructure can be used.

Figure 13:
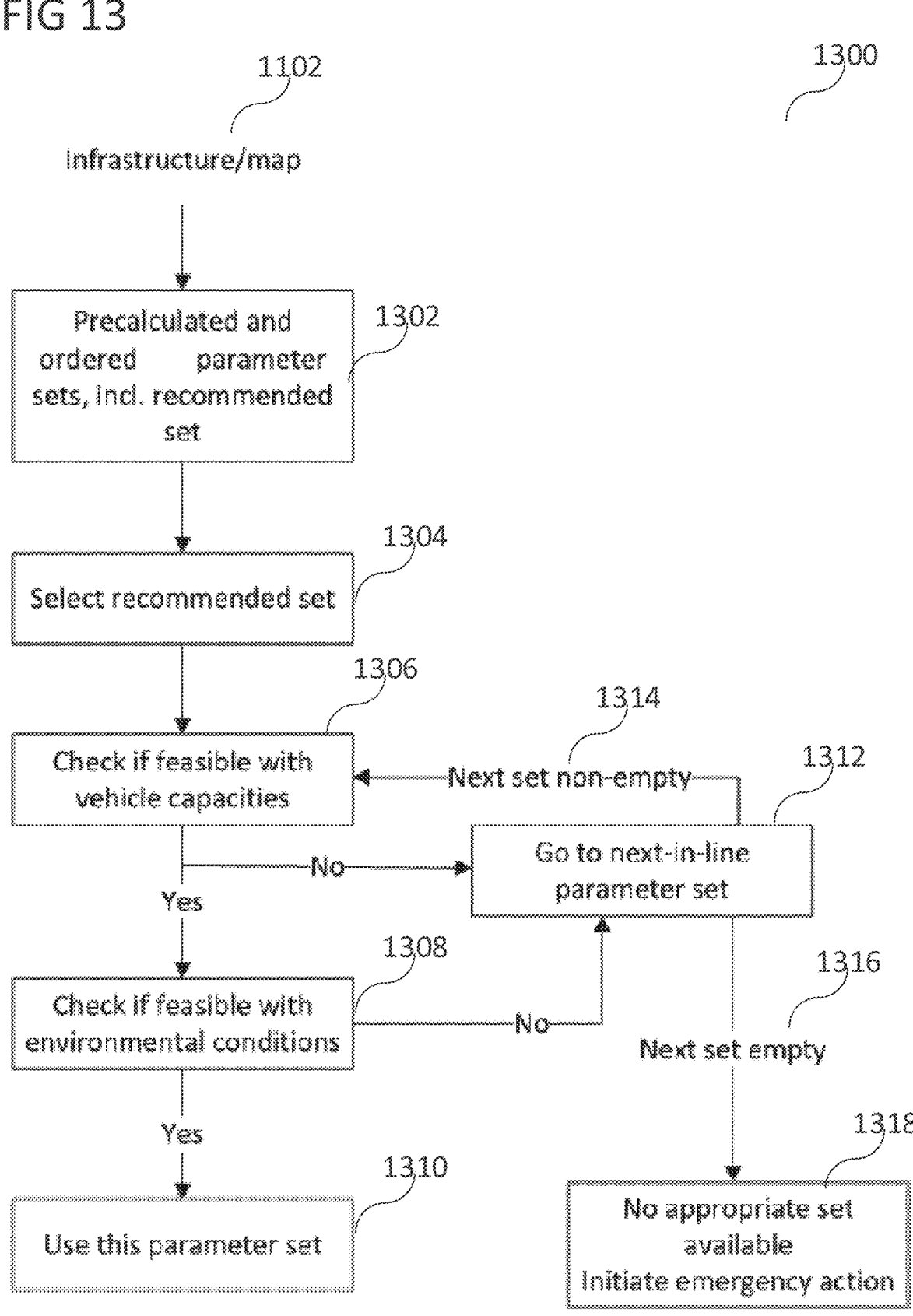
FIG. 13 shows a process of selecting a driving model parameter set (e.g. safety driving model parameter set) from a plurality of driving model parameter sets (e.g. safety driving model parameter sets)

Furthermore, it is to be noted that in no case, a driving model parameter set is allowed to be used that is not compatible with the current conditions and vehicle characteristics. Therefore, various aspects provide a process 1300 as shown in FIG. 13, to ensure safety. The provided checks can either be performed inside the vehicle (using map and sensor information), but also can include the infrastructure.

FIG. 13 shows a process 1300 of selecting a driving model parameter set (e.g. safety driving model parameter set) from a plurality of driving model parameter sets (e.g. safety driving model parameter sets).

Process 1300 ensures that each vehicle only uses/selects an executable driving model parameter set (e.g. safety driving model parameter set) from the plurality of driving model parameter sets (e.g. safety driving model parameter sets).

A processor of the one or more processors 102 may implement and perform the process 1300.

The process 1300 may include, in 1302, receiving and storing precalculated (e.g. predefined) and ordered driving model parameter sets (e.g. safety driving model parameter sets), optionally including a recommended driving model parameter set (e.g. recommended safety driving model parameter set). Furthermore, in 1304, the process 1300 may further include to select the recommended driving model parameter set (e.g. recommended safety driving model parameter set) and, in 1306, to check if the recommended driving model parameter set (e.g. recommended safety driving model parameter set) is feasible with the vehicle's 100 capabilities. If the recommended driving model parameter set (e.g. recommended safety driving model parameter set) is feasible with the vehicle's 100 capabilities ("Yes" in 1306), the process 1300 optionally continues, in 1308, to check if the recommended driving model parameter set (e.g. recommended safety driving model parameter set) is feasible with predefined environmental conditions. If the recommended driving model parameter set (e.g. recommended safety driving model parameter set) is feasible with predefined environmental conditions ("Yes" in 1308), the driving model (e.g. safety driving model) may use the recommended driving model parameter set (e.g. recommended safety driving model parameter set) in 1310. If the recommended driving model parameter set (e.g. recommended safety driving model parameter set) is not feasible with the vehicle's 100 capabilities ("No" in 1306), the process 1300 continues in 1312 to go to the next in-line driving model parameter set 1314 (e.g. next in-line safety driving model parameter set 1314) of the plurality of driving model parameter sets (e.g. plurality of safety driving model parameter sets). The process 1300 in this case continues in 1306 for the next in-line driving model parameter set 1314 (e.g. next in-line safety driving model parameter set 1314). If there is no next in-line driving model parameter set 1314 (e.g. no next in-line safety driving model parameter set 1314) available (1316), the process 1300 continues in 1318 concluding that there is no appropriate driving model parameter set (e.g. no appropriate safety driving model parameter set) available. Furthermore, the process may include in 1318 initiating a predefined emergency action, e.g. a warning of the driver, a smooth deceleration and/or stopping of the vehicle 100, and/or selecting and performing a predefined emergency driving model parameter set (e.g. emergency safety driving model parameter set). If the recommended driving model parameter set (e.g. recommended safety driving model parameter set) is not feasible with predefined environmental conditions ("No" in 1308), the process 1300 continues in 1312.

Safety Driving Model Parameter Selection on Multilane Highways

If a road contains multiple lanes (e.g. lanes 1104, 1106, 1108) for each driving direction (e.g. highways), the driving model parameter set (and negotiation) can make use of this circumstance. In future traffic it is possible, to have lanes with different safety driving model parameter sets, similar to today's priority or bus lanes. If the vehicle 100 accepts the infrastructure preferred parameter set, it is allowed to take the "best" lane (for example with lowest safety distances, to achieve high throughput, e.g. the first lane 1104). If the vehicle 100 only accepts the fallback option, it can only use the "intermediate" lane (e.g. the second lane 1106), and if it does not respond to the handshaking process, it is only allowed to use the "worst" lane (e.g. for human traffic, e.g. the third lane 1108). Overall, this may improve the traffic throughput and traffic flow, as vehicles with similar profiles may be group into "platoons".

FIG. 14 shows a method 1400 of operating a safety system for a vehicle.

The method 1400 may include, in 1402, detecting vehicle operation data during operation of the vehicle, in 1404, controlling a vehicle to operate in accordance with a predefined stored driving model parameter set from a plurality of driving model parameter sets and a driving model, in 1406, detecting vehicle operation data during the operation of the vehicle, in 1408, determining whether to select another stored driving model parameter set from the plurality of driving model parameter sets based on the detected vehicle operation data and the driving model parameter set from the plurality of driving model parameter sets, in 1410, selecting the driving model parameter set from the plurality of driving model parameter sets to a newly selected driving model parameter set, and, in 1412, controlling the vehicle to operate in accordance with the newly selected driving model parameter set.

In the following, a dynamic and safe safety driving model parameters runtime configuring method will be described in detail.

As already described above, the real traffic is very complex and always changing. However, current safety driving model parameters are usually designed to be set before the vehicle starting. A constant safety driving model parameters cannot meet various traffic situations. For example, if it starts raining during the vehicle running, the brake distance may need change to be longer. Another case, if the traffic is very light in a good weather, the vehicle 100 may need to accelerate more quickly and keep a shorter following distance.

In various aspects, a dynamic and safe configuring safety driving model parameters in runtime is provided.

Illustratively, e.g. a processor of the one or more processors 102 may implement this method and may collect impact factors of safety and evaluate/discriminate to form real time safety evaluation with de jitter and grading. According to the safety evaluation, a certain set of safety driving model parameters (in other words safety driving model parameter sets, in general driving model parameter set) will be chosen and compared with current parameters to guarantee a smoothing switch. This set of safety driving model parameters will also loop back to evaluate with impact factors to keep a stable runtime switching.

Various aspects may improve the flexibility of safety driving model rule to meet various traffic environment. Furthermore, various aspects may enhance the safety and improve driving efficiency simultaneously.

Figure 15:
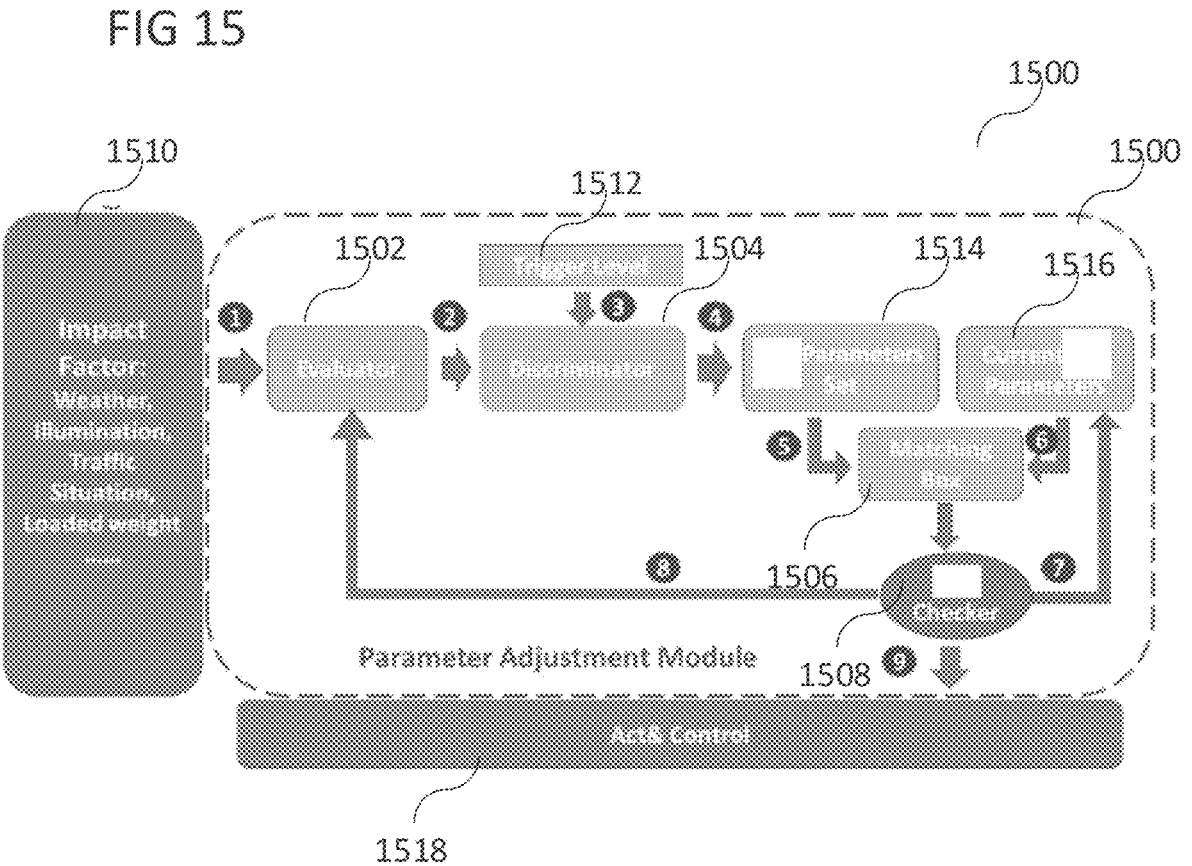
FIG. 15 shows a block diagram illustrating a safety system in accordance with various aspects of this disclosure.

FIG. 15 shows a block diagram 1500 illustrating a safety system in accordance with various aspects. As already described above, one or more processors 102 of the vehicle 100 may implement the safety system and perform the methods as described with reference to FIG. 15.

As shown in FIG. 15, this configuring method may include or essentially consist of four main functions: an evaluator 1502, a discriminator 1504, a matching processor 1506, and an safety driving model checker 1508.

The workflow of a method implemented by the safety system may be as follows:

The one or more processors 102 may collect impact factors 1510 (weather/illumination/etc.) and input them to the evaluator 1502.

The safety driving model checker 1508 may double-check if the finally selected safety driving model parameter set 1514 is valid and send it to vehicle act& control module 1518 to configure the safety driving model. Also it will update the current safety driving model parameters set 1516 and loop back to the evaluator 1502 to keep a closed loop running.

The one or more processors 102 may control the vehicle 100 in accordance with the selected and verified safety driving model parameter set 1514.

Figure 16:
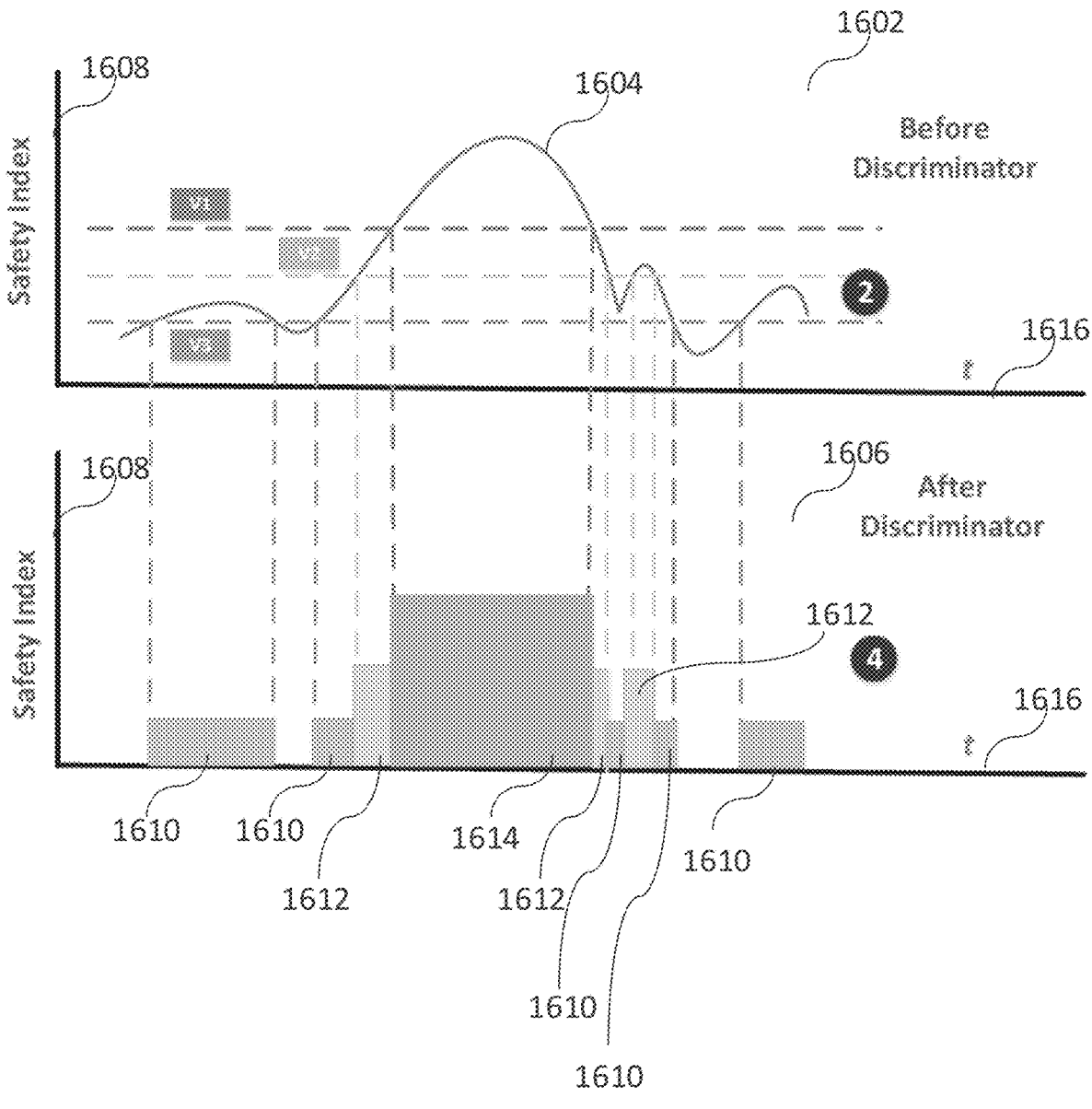
FIG. 16 shows the function of the discriminator of the safety system in accordance with various aspects of this disclosure.

FIG. 16 shows the function of the discriminator 1504 of the safety system. An upper diagram 1602 shows the signal input to discriminator 1504. It directly reflects the real time safety evaluation result signal 1604 input from the evaluator 1502. The safety evaluation result signal 1604 includes a lot of jitter and noise. The discriminator 1504 will filter such noise and jitter by quantizing the safety evaluation result signal 1604 to a respective safety index 1608 with multiple trigger levels 1512 (e.g. a first trigger level V1, a second trigger level V2, a third trigger level V3 as examples of the trigger levels 1512) as shown in lower diagram 1606. Thus, FIG. 16 shows an example of three trigger levels V1, V2, V3 which may result in different safety index values, e.g. a first safety index value 1610, a second safety index value 1612, and a third safety index value 1614 during various time intervals along time axis t 1616.

The matching processor 1506 may be configured to ensure that the configuration of the safety system in accordance with the selected safety driving model parameter set 1514 is smooth.

Below is a representation of a pseudo code to explain the function of the matching processor 1506. It is similar to a gear box in a vehicle to control the speed of a vehicle.

```
defMatchingBox(Next_Param_Set, Current_Param_Set,step_num, threshold,
time_interval):
    // this fuction will compare next safety driving model parameter set which is the
one will be configured //with current safety driving model parameter set
    // if the gap over the threshold, next safety driving model parameter will be
configured with some step //values to avoid sudden speed/accelaration change
    for i in range(len(Next_Param_Set)):
        if abs(Next_Param_Set [i]– Current_Param_Set [i])>threshold[i]:
            step_value=(Next_Param_Set [i]– Current_Param_Set [i])/step_num
            step_interval[i]=time_interval
            output_Patam_Set[i]= Current_Param_Set [i]+step_value*[1:step_num]
        return: output_Patam_Set, step_interval
```

The evaluator 1504 may calculate and analyses all impact factors with weights and output as safety index.

The discriminator 1506 may get one or more predefined trigger levels 1512 (which may be stored in one or more memories 202 of the vehicle 100) and may quantitize the safety index using the one or more predefined trigger levels. Then, a generated quantitized safety index will search safety driving model parameters list to find and select a corresponding parameter set. The safety driving model parameters list may be preset e.g. by a vehicle manufacturer and/or by a safety system developer, and may be carefully verified to guarantee safety.

A selected safety driving model parameters set 1514 will be compared with a current safety driving model parameter set 1516 to ensure a smooth configuration process of the safety system if the difference is too large.

FIG. 17 shows a method 1700 of operating a safety system for a vehicle. The method 1700 may include, in 1702, controlling a vehicle to operate in accordance with predefined driving model parameters and a driving model, in 1704, detecting vehicle operation data during the operation of the vehicle, in 1706, determining a weighted combination of the detected vehicle operation data, in 1708, determining whether the weighted combination triggers a change of the driving model parameters to changed driving model parameters, and, in 1710, controlling the vehicle to operate in accordance with the changed driving model parameters.

In the following, various aspects of this disclosure will be illustrated:

Example 1 is a safety system for a vehicle. The safety system may optionally include a memory storing driving model parameters. The safety system may include one or more processors configured to control a vehicle to operate in accordance with predefined driving model parameters, to detect vehicle operation data during the operation of the vehicle, to determine whether to change predefined driving model parameters based on the detected vehicle operation data and the driving model parameters, to change the driving model parameters to changed driving model parameters, and to control the vehicle to operate in accordance with the changed driving model parameters.

Example 2 is a safety system for a vehicle. The safety system may include one or more processors configured to detect vehicle operation data during operation of the vehicle, to determine one or more dangerous situations using the vehicle operation data in accordance with a predefined driving policy, to classify the one or more dangerous situations into one or more predefined situation classes, and to generate a situation report message. The situation report message includes information about the one or more classified situation classes associated with a time information and with a location information. The time information indicates at which time a respective classified situation class occurred. The location information indicates at which location a respective classified situation class occurred. The situation report message may further include safety system parameters in effect during the dangerous situation and any other vehicle parameters that might impact actuation, as well as other vehicle's observed variables (e.g. position, velocity and safety parameters derived from observation or from wireless communication).

In Example 3, the subject matter of Example 2 can optionally include that the one or more processors are configured to implement the predefined driving policy.

In Example 4, the subject matter of Example 3 can optionally include that the one or more processors are configured to implement an advanced driver assistance system including the predefined driving policy.

In Example 5, the subject matter of Example 4 can optionally include that the advanced driver assistance system includes a safety driving model.

In Example 6, the subject matter of any one of Examples 2 to 5 can optionally include that the one or more processors are configured to classify a dangerous situation of the one or more dangerous situations into a predefined situation class of the one or more predefined situation classes (e.g. only) if the dangerous situation has been determined for a predefined time period.

In Example 7, the subject matter of any one of Examples 2 to 6 can optionally include that the situation report message further includes response information indicating how the safety system reacted on a dangerous situation of the one or more dangerous situations.

In Example 8, the subject matter of any one of Examples 2 to 7 can optionally include that the situation report message further includes duration information indicating a time duration of a dangerous situation of the one or more dangerous situations.

In Example 9, the subject matter of any one of Examples 2 to 8 can optionally include that the situation report message further includes criticality information indicating a severity measure of a dangerous situation of the one or more dangerous situations.

In Example 10, the subject matter of any one of Examples 2 to 9 can optionally include that the one or more processors are configured to send the situation report message to another device.

In Example 11, the subject matter of Example 10 can optionally include that the other device includes one or more safety system servers.

In Example 12, the subject matter of any one of Examples 2 to 11 can optionally include that the one or more dangerous situations include a plurality of dangerous situations. A probability of a dangerous situation is assigned to each dangerous situation of the plurality of dangerous situations.

In Example 13, the subject matter of any one of Examples 2 to 12 can optionally include that the one or more processors are configured to provide vehicle control information to control the vehicle in accordance with a digital risk map including one or more regions in which a probability of an associated dangerous situation is indicated.

Example 14 is a safety system server. The safety system server may include one or more processors configured to receive at least one situation report message including information about one or more classified situation classes associated with a time information and with a location information. The time information indicates at which time a respective classified situation class occurred at a vehicle. The location information indicates at which location a respective classified situation class occurred at a vehicle. The situation report message may further include safety system parameters in effect during the dangerous situation and any other vehicle parameters that might impact actuation, as well as other vehicle's observed variables (e.g. position, velocity and safety parameters derived from observation or from wireless communication). The one or more processors may further be configured to generate or update a digital risk map including one or more regions in which one or more probabilities of one or more dangerous situations is indicated based on the received at least one situation report message. One probability is assigned to one respective dangerous situation.

In Example 15, the subject matter of Example 14 can optionally include that the one or more processors are configured to receive at least one situation report message from a plurality of vehicles, respectively.

In Example 16, the subject matter of any one of Examples 14 or 15 can optionally include that the digital risk map includes a grid structure having a resolution of the grid in the range from about 1 m to about 50 m, e.g. in the range from about 2 m to about 20 m, in the physical region represented by the digital risk map.

In Example 17, the subject matter of any one of Examples 14 to 16 can optionally include that the one or more processors are configured to determine the probability of a dangerous situation in a specific region using at least one of: a criticality information indicating a severity measure of a dangerous situation of the one or more dangerous situations, and a time duration of a dangerous situation of the one or more dangerous situations.

In Example 18, the subject matter of any one of Examples 14 to 17 can optionally include that the one or more processors are configured to send the generated or updated digital risk map to one or more vehicles.

In Example 19, the subject matter of any one of Examples 14 to 18 can optionally include that the one or more processors are configured to send a portion of the generated or updated digital risk map to one or more vehicles depending on the position of the one or more vehicles.

Example 20 is a method of operating a safety system for a vehicle. The method may include detecting vehicle operation data during operation of the vehicle, determining one or more dangerous situations using the vehicle operation data in accordance with a predefined driving policy, classifying the one or more dangerous situations into one or more predefined situation classes, and generating a situation report message. The situation report message includes information about the one or more classified situation classes associated with a time information and a location information. The time information indicates at which time a respective classified situation class occurred. The location information indicates at which location a respective classified situation class occurred. The situation report message may further include safety system parameters in effect during the dangerous situation and any other vehicle parameters that might impact actuation, as well as other vehicle's observed variables (e.g. position, velocity and safety parameters derived from observation or from wireless communication).

In Example 21, the subject matter of Example 20 can optionally include that the method further includes implementing the predefined driving policy.

In Example 22, the subject matter of Example 21 can optionally include that the method further includes implementing an advanced driver assistance system including the predefined driving policy.

In Example 23, the subject matter of Example 22 can optionally include that the advanced driver assistance system includes a safety driving model.

In Example 24, the subject matter of any one of Examples 20 to 23 can optionally include that the method further includes classifying a dangerous situation of the one or more dangerous situations into a predefined situation class of the one or more predefined situation classes only if the dangerous situation has been determined for a predefined time period.

In Example 25, the subject matter of any one of Examples 20 to 24 can optionally include that the situation report message further includes response information indicating how the safety system reacted on a dangerous situation of the one or more dangerous situations.

In Example 26, the subject matter of any one of Examples 20 to 25 can optionally include that the situation report message further includes duration information indicating a time duration of a dangerous situation of the one or more dangerous situations.

In Example 27, the subject matter of any one of Examples 20 to 26 can optionally include that the situation report message further includes criticality information indicating a severity measure of a dangerous situation of the one or more dangerous situations.

In Example 28, the subject matter of any one of Examples 20 to 27 can optionally include that the method further includes sending the situation report message to another device.

In Example 29, the subject matter of Example 28 can optionally include that the other device includes one or more safety system servers.

In Example 30, the subject matter of any one of Examples 20 to 29 can optionally include that the one or more dangerous situations include a plurality of dangerous situations. A probability of a dangerous situation is assigned to each dangerous situation of the plurality of dangerous situations.

In Example 31, the subject matter of any one of Examples 20 to 30 can optionally include that the method further includes providing vehicle control information to control the vehicle in accordance with a digital risk map including one or more regions in which a probability of a dangerous situation is indicated.

Example 32 is a method operating a safety system server. The method may include receiving at least one situation report message. The situation report message includes information about one or more classified situation classes associated with a time information and a location information.

The time information indicates at which time a respective classified situation class occurred at a vehicle. The location information indicates at which location a respective classified situation class occurred at a vehicle. The situation report message may further include safety system parameters in effect during the dangerous situation and any other vehicle parameters that might impact actuation, as well as other vehicle's observed variables (e.g. position, velocity and safety parameters derived from observation or from wireless communication). The method may further include generating or updating a digital risk map including one or more regions in which one or more probabilities of one or more dangerous situations is indicated based on the received at least one situation report message. One probability is assigned to one respective dangerous situation.

In Example 33, the subject matter of Example 32 can optionally include that the method further includes receiving at least one situation report message from a plurality of vehicles, respectively.

In Example 34, the subject matter of any one of Examples 32 or 33 can optionally include that the digital risk map includes a grid structure having a resolution of the grid in the range from about 1 m to about 50 m, e.g. in the range from about 2 m to about 20 m, in the physical region represented by the digital risk map.

In Example 35, the subject matter of any one of Examples 32 to 34 can optionally include that the probability of a dangerous situation in a specific region is determined using at least one of: a criticality information indicating a severity measure of a dangerous situation of the one or more dangerous situations, and a time duration of a dangerous situation of the one or more dangerous situations.

In Example 36, the subject matter of any one of Examples 32 to 35 can optionally include that the method further includes sending the generated or updated digital risk map to one or more vehicles.

In Example 37, the subject matter of any one of Examples 32 to 36 can optionally include that the method further includes sending a portion of the generated or updated digital risk map to one or more vehicles depending on the position of the one or more vehicles.

Example 38 is a safety system for a vehicle. The safety system may optionally include memory means for storing driving model parameters. The safety system may include means for controlling a vehicle to operate in accordance with predefined driving model parameters, means for detecting vehicle operation data during the operation of the vehicle, means for determining whether to change predefined driving model parameters based on the detected vehicle operation data and the driving model parameters, means for changing the driving model parameters to changed driving model parameters, and means for controlling the vehicle to operate in accordance with the changed driving model parameters.

Example 39 is a safety system server. The safety system server may include means for receiving at least one situation report message including information about one or more classified situation classes associated with a time information and a location information. The time information indicates at which time a respective classified situation class occurred at a vehicle. The location information indicates at which location a respective classified situation class occurred at a vehicle. The situation report message may further include safety system parameters in effect during the dangerous situation and any other vehicle parameters that might impact actuation, as well as other vehicle's observed variables (e.g. position, velocity and safety parameters derived from observation or from wireless communication). The safety system server may further include means for generating or updating a digital risk map including one or more regions in which one or more probabilities of one or more dangerous situations is indicated based on the received at least one situation report message. One probability is assigned to one respective dangerous situation.

Example 40 is a non-transient computer-readable storage medium storing instruction, when executed by a processor, implementing a method of operating a safety system for a vehicle of any one of Examples 20 to 31.

Example 41 is a non-transient computer-readable storage medium storing instruction, when executed by a processor, implementing a method of operating a safety system for a vehicle of any one of Examples 32 to 37.

Example 42 is a safety system for a vehicle. The safety system may include one or more processors configured to detect vehicle operation data during operation of the vehicle, to control a vehicle to operate in accordance with a pre-defined stored driving model parameter set from a plurality of driving model parameter sets and a driving model, to detect vehicle operation data during the operation of the vehicle, to determine whether to select another stored driving model parameter set from the plurality of driving model parameter sets based on the detected vehicle operation data and the driving model parameter set from the plurality of driving model parameter sets, to select the driving model parameter set from the plurality of driving model parameter sets to a newly selected driving model parameter set, and to control the vehicle to operate in accordance with the newly selected driving model parameter set.

In Example 43, the subject matter of Example 42 can optionally include that the safety system further includes a memory storing the plurality of driving model parameter sets, each driving model parameter set of the plurality of driving model parameter sets including a plurality of driving model parameters.

In Example 44, the subject matter of any one of Examples 42 or 43 can optionally include that each driving model parameter set of the plurality of driving model parameter sets is pre-certified.

In Example 45, the subject matter of any one of Examples 42 to 44 can optionally include that each driving model parameter set of the plurality of driving model parameter sets is received by at least one of: a manufacturer of the vehicle, a programmer of the driving model, and/or a trusted instance certifying the driving model.

In Example 46, the subject matter of any one of Examples 42 to 45 can optionally include that each driving model parameter set of the plurality of driving model parameter sets includes at least one of the following driving model parameters: a minimum braking force of a rear vehicle, a maximum braking force of a front vehicle, a maximum acceleration of the rear vehicle, a reaction time of the safety system, lateral acceleration of the different vehicles, response times of the different vehicles (front, rear, left, right) and fluctuation margin (by how much you are allowed to drift inside a respective lane, and the like.

In Example 47, the subject matter of any one of Examples 42 to 46 can optionally include that the vehicle operation data are selected from a group consisting of: a road condition of the road the vehicle is driving on, a weather conditions in the environment of the vehicle, a digital risk map including one or more regions in which a probability of a dangerous situation is indicated, a type of the vehicle, a status of the vehicle, a digital map, and a passenger input.

In Example 48, the subject matter of any one of Examples 42 to 47 can optionally include that the one or more processors are configured to select the driving model parameter set from the plurality of driving model parameter sets in accordance with a select instruction received from road side infrastructure received via V2X communication.

In Example 49, the subject matter of any one of Examples 42 to 48 can optionally include that the one or more processors are configured to check if the newly selected driving model parameter set meets with a safety guarantee in accordance with the driving model, and to use the newly selected driving model parameter set to control the vehicle to operate in accordance with the newly selected driving model parameter set only in case the newly selected driving model parameter set meets with a safety guarantee in accordance with the driving model.

In Example 50, the subject matter of Example 49 can optionally include that the one or more processors are configured to negotiate with another device to select yet another driving model parameter set of the plurality of driving model parameter sets.

In Example 51, the subject matter of any one of Examples 42 to 50 can optionally include that at least some driving model parameter sets of the plurality of stored driving model parameter sets are associated with a driving lane characteristic. The one or more processors are configured to determine a driving lane characteristic of the driving lane the vehicle is driving on, and to select the driving model parameter set of the plurality of driving model parameter sets in accordance with the determined driving lane characteristic.

In Example 52, the subject matter of any one of Examples 42 to 51 can optionally include that the driving lane characteristic includes at least one of: priority of the associated driving lane, maximum speed allowed on the associated driving lane, minimum speed allowed on the associated driving lane, and/or type of vehicle allowed to drive on the associated driving lane.

In Example 53, the subject matter of any one of Examples 42 to 52 can optionally include that the one or more processors are configured to implement an advanced driver assistance system including the driving model.

In Example 54, the subject matter of Example 53 can optionally include that the one or more processors are configured to implement an advanced driver assistance system including a predefined driving policy.

In Example 55, the subject matter of any one of Examples 42 to 54 can optionally include that the one or more processors are configured to implement a safety driving model.

Example 56 is a method of operating a safety system for a vehicle. The method may include detecting vehicle operation data during operation of the vehicle, controlling a vehicle to operate in accordance with a predefined stored driving model parameter set from a plurality of driving model parameter sets and a driving model, detecting vehicle operation data during the operation of the vehicle, determining whether to select another stored driving model parameter set from the plurality of driving model parameter sets based on the detected vehicle operation data and the driving model parameter set from the plurality of driving model parameter sets, selecting the driving model parameter set from the plurality of driving model parameter sets to a newly selected driving model parameter set, and controlling the vehicle to operate in accordance with the newly selected driving model parameter set.

In Example 57, the subject matter of Example 56 can optionally include that the method further includes a memory storing the plurality of driving model parameter sets, each driving model parameter set of the plurality of driving model parameter sets including a plurality of driving model parameters.

In Example 58, the subject matter of any one of Examples 56 or 57 can optionally include that each driving model parameter set of the plurality of driving model parameter sets is pre-certified.

In Example 59, the subject matter of any one of Examples 56 to 58 can optionally include that each driving model parameter set of the plurality of driving model parameter sets is received by at least one of: a manufacturer of the vehicle, a programmer of the driving model, and a trusted instance certifying the driving model.

In Example 60, the subject matter of any one of Examples 56 to 59 can optionally include that each driving model parameter set of the plurality of driving model parameter sets includes at least one of the following driving model parameters: a minimum braking force of a rear vehicle, a maximum braking force of a front vehicle, a maximum acceleration of the rear vehicle, a reaction time of the safety system, lateral acceleration of the different vehicles, response times of the different vehicles (front, rear, left, right) and fluctuation margin (by how much you are allowed to drift inside a respective lane, and the like.

In Example 61, the subject matter of any one of Examples 56 to 60 can optionally include that the vehicle operation data are selected from a group consisting of: a road condition of the road the vehicle is driving on, a weather conditions in the environment of the vehicle, a digital risk map including one or more regions in which a probability of a dangerous situation is indicated, a type of the vehicle, a status of the vehicle, a digital map, and a passenger input.

In Example 62, the subject matter of any one of Examples 56 to 61 can optionally include that the method further includes selecting the driving model parameter set from the plurality of driving model parameter sets in accordance with a select instruction received from road side infrastructure received via V2X communication.

In Example 63, the subject matter of any one of Examples 56 to 62 can optionally include that the method further includes checking if the newly selected driving model parameter set meets with a safety guarantee in accordance with the driving model, and using the newly selected driving model parameter set to control the vehicle to operate in accordance with the newly selected driving model parameter set only in case the newly selected driving model parameter set meets with a safety guarantee in accordance with the driving model.

In Example 64, the subject matter of Example 63 can optionally include that the method further includes negotiating with another device to select yet another driving model parameter set of the plurality of driving model parameter sets.

In Example 65, the subject matter of any one of Examples 56 to 64 can optionally include that at least some driving model parameter sets of the plurality of stored driving model parameter sets are associated with a driving lane characteristic. The method further includes determining a driving lane characteristic of the driving lane the vehicle is driving on, and selecting the driving model parameter set of the plurality of driving model parameter sets in accordance with the determined driving lane characteristic.

In Example 66, the subject matter of any one of Examples 56 to 65 can optionally include that the driving lane characteristic includes at least one of: priority of the associated driving lane, maximum speed allowed on the associated driving lane, minimum speed allowed on the associated driving lane, and type of vehicle allowed to drive on the associated driving lane.

In Example 67, the subject matter of any one of Examples 56 to 66 can optionally include that the method further includes implementing an advanced driver assistance system including the driving model.

In Example 68, the subject matter of Example 67 can optionally include that the method further includes implementing an advanced driver assistance system including a predefined driving policy.

In Example 69, the subject matter of Example 68 can optionally include that the advanced driver assistance system includes a safety driving model.

Example 70 is a safety system for a vehicle. The safety system may include means for detecting vehicle operation data during operation of the vehicle, means for controlling a vehicle to operate in accordance with a predefined stored driving model parameter set from a plurality of driving model parameter sets and a driving model, means for detecting vehicle operation data during the operation of the vehicle, means for determining whether to select another stored driving model parameter set from the plurality of driving model parameter sets based on the detected vehicle operation data and the driving model parameter set from the plurality of driving model parameter sets, means for selecting the driving model parameter set from the plurality of driving model parameter sets to a newly selected driving model parameter set, and means for controlling the vehicle to operate in accordance with the newly selected driving model parameter set.

Example 71 is a non-transient computer-readable storage medium storing instruction, when executed by a processor, implementing a method of operating a safety system for a vehicle of any one of Examples 56 to 69.

Example 72 is a safety system for a vehicle. The safety system may include one or more processors configured to control a vehicle to operate in accordance with predefined driving model parameters and a driving model, to detect vehicle operation data during the operation of the vehicle, to determine a weighted combination of the detected vehicle operation data, to determine whether the weighted combination triggers a change of the driving model parameters to changed driving model parameters, and to control the vehicle to operate in accordance with the changed driving model parameters.

In Example 73, the subject matter of Example 72 can optionally include that the vehicle operation data are selected from a group consisting of: a road condition of the road the vehicle is driving on, a weather conditions in the environment of the vehicle, a digital risk map including one or more regions in which a probability of a dangerous situation is indicated, a type of the vehicle, and/or a status of the vehicle.

In Example 74, the subject matter of any one of Examples 72 or 73 can optionally include that the one or more processors are configured to quantize the weighted combination of the detected vehicle operation data, and to determine whether the quantized weighted combination triggers a change of the driving model parameters to changed driving model parameters.

In Example 75, the subject matter of any one of Examples 72 to 74 can optionally include that the one or more processors are configured to check if the changed driving model parameters fulfill a predefined smoothness criterion describing a smoothness of the change of the driving model parameters to the changed driving model parameters when controlling the vehicle to operate in accordance with the changed driving model parameters and use the changed driving model parameters to control the vehicle to operate only if the smoothness criterion is fulfilled.

In Example 76, the subject matter of Example 75 can optionally include that the one or more processors are configured to reject to use the changed driving model parameters to control the vehicle to operate if the changed driving model parameters do not fulfill the predefined smoothness criterion.

In Example 77, the subject matter of any one of Examples 72 to 76 can optionally include that the one or more processors are configured to check if the changed driving model parameters meet with a safety guarantee in accordance with the driving model, and to use the changed driving model parameters to control the vehicle to operate in accordance with the changed driving model parameters only in case the changed driving model parameters meet with a safety guarantee in accordance with the driving model.

In Example 78, the subject matter of any one of Examples 72 to 77 can optionally include that the one or more processors are configured to implement an advanced driver assistance system including the driving model.

In Example 79, the subject matter of Example 78 can optionally include that the one or more processors are configured to implement an advanced driver assistance system including a predefined driving policy.

In Example 80, the subject matter of Example 79 can optionally include that the advanced driver assistance system includes a safety driving model.

Example 81 is a method of operating a safety system for a vehicle. The method may include controlling a vehicle to operate in accordance with predefined driving model parameters and a driving model, detecting vehicle operation data during the operation of the vehicle, determining a weighted combination of the detected vehicle operation data, determining whether the weighted combination triggers a change of the driving model parameters to changed driving model parameters, and controlling the vehicle to operate in accordance with the changed driving model parameters.

In Example 82, the subject matter of Example 81 can optionally include that the vehicle operation data are selected from a group consisting of: a road condition of the road the vehicle is driving on, a weather conditions in the environment of the vehicle, a digital risk map including one or more regions in which a probability of a dangerous situation is indicated, a type of the vehicle, and a status of the vehicle.

In Example 83, the subject matter of any one of Examples 81 or 82 can optionally include that the method further includes quantizing the weighted combination of the detected vehicle operation data, and determining whether the quantized weighted combination triggers a change of the driving model parameters to changed driving model parameters.

In Example 84, the subject matter of any one of Examples 81 to 83 can optionally include that the method further includes checking if the changed driving model parameters fulfill a predefined smoothness criterion describing a smoothness of the change of the driving model parameters to the changed driving model parameters when controlling the vehicle to operate in accordance with the changed driving model parameters and using the changed driving model parameters to control the vehicle to operate only if the smoothness criterion is fulfilled.

In Example 85, the subject matter of Example 84 can optionally include that the method further include rejecting to use the changed driving model parameters to control the vehicle to operate if the changed driving model parameters do not fulfill the predefined smoothness criterion.

In Example 86, the subject matter of any one of Examples 81 to 85 can optionally include that checking if the changed driving model parameters meet with a safety guarantee in accordance with the driving model, and using the changed driving model parameters to control the vehicle to operate in accordance with the changed driving model parameters only in case the changed driving model parameters meet with a safety guarantee in accordance with the driving model.

In Example 87, the subject matter of any one of Examples 81 to 86 can optionally include that the method further includes implementing an advanced driver assistance system including the driving model.

In Example 88, the subject matter of Example 87 can optionally include that the method further includes implementing an advanced driver assistance system including a predefined driving policy.

In Example 89, the subject matter of Example 88 can optionally include that the advanced driver assistance system includes a safety driving model.

Example 90 is a safety system for a vehicle. The safety system may include means for controlling a vehicle to operate in accordance with predefined driving model parameters and a driving model, means for detecting vehicle operation data during the operation of the vehicle, means for determining a weighted combination of the detected vehicle operation data, means for determining whether the weighted combination triggers a change of the driving model parameters to changed driving model parameters, and means for controlling the vehicle to operate in accordance with the changed driving model parameters.

Example 91 is a vehicle including a safety system of any one of Examples 1 to 13, 38, 42 to 55, 70, 72 to 80, or 90.

Example 91 is a non-transient computer-readable storage medium storing instruction, when executed by a processor, implementing a method of operating a safety system for a vehicle of any one of Examples 81 to 89.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A safety system of a vehicle, the safety system comprising:
  one or more processors configured to
  detect vehicle operation data during operation of the vehicle, wherein the vehicle operation data includes information associated with conditions detected in an environment of the vehicle including at least one distance between the vehicle and one or more objects in the environment of the vehicle;
  determine one or more dangerous situations using the vehicle operation data in accordance with a predefined driving policy, wherein the one or more dangerous situations is based on the at least one distance between the vehicle and the one or more objects in the environment of the vehicle relative to at least one distance threshold;

classify the one or more dangerous situations into one or more predefined situation classes;

generate a situation report message comprising information about the one or more classified situation classes associated with a time information, wherein the time information indicates at which time a respective classified situation class occurred, and wherein the one or more classified situation classes is further associated with a location information indicating at which location a respective classified situation class occurred;

based on the generated situation report message, cause generation or updating of a digital risk map, wherein the digital risk map includes a representation of at least one region associated with the one or more dangerous situations, and wherein a point in the digital risk map is associated with a temperature vector including a criticality of one or more dangerous situations encountered at the point in the digital risk map; and cause at least one of the vehicle or at least one second vehicle to be operated based on the digital risk map.

2. The safety system of claim 1, wherein the one or more processors are configured to implement a safety driving model.

3. The safety system of claim 1, wherein the one or more processors are configured to classify a dangerous situation of the one or more dangerous situations into a predefined situation class of the one or more predefined situation classes only if the dangerous situation has been determined for a predefined time period.

4. The safety system of claim 1, wherein the situation report message further comprises at least one of the following:

response information indicating how the safety system reacted on a dangerous situation of the one or more dangerous situations;

duration information indicating a time duration of a dangerous situation of the one or more dangerous situations;

criticality information indicating a severity measure of a dangerous situation of the one or more dangerous situations;

safety system parameters in effect during the dangerous situation;

vehicle parameters that impact actuation;

vehicle's observed variables.

5. The safety system of claim 1, wherein the one or more dangerous situations comprise a plurality of dangerous situations; and wherein a probability of a dangerous situation is assigned to each dangerous situation of the plurality of dangerous situations.

6. The safety system of claim 1, wherein the one or more processors are configured to provide vehicle control information to control the vehicle in accordance with the digital risk map comprising one or more regions in which a probability of an associated dangerous situation is indicated.

7. The safety system of claim 1, wherein the one or more processors are further configured to control the vehicle to operate in accordance with a predefined stored driving model parameter set from a plurality of driving model parameter sets and a driving model, and wherein the safety system further comprises a memory storing the plurality of driving model parameter sets, each driving model parameter set of the plurality of driving model parameter sets comprising a plurality of driving model parameters.

8. The safety system of claim 7, wherein the one or more processors are further configured to determine whether to select a second stored driving model parameter set from the plurality of driving model parameter sets based on the detected vehicle operation data and the driving model parameter set from the plurality of driving model parameter sets;

select the driving model parameter set from the plurality of driving model parameter sets as a newly selected driving model parameter set; and control the vehicle to operate in accordance with the newly selected driving model parameter set.

9. The safety system of claim 8, wherein the one or more processors are further configured to check if the newly selected driving model parameter set meets with a safety guarantee in accordance with the driving model; and use the newly selected driving model parameter set to control the vehicle to operate in accordance with the newly selected driving model parameter set only in case the newly selected driving model parameter set meets with a safety guarantee in accordance with the driving model.

10. The safety system of claim 8, wherein the one or more processors are further configured to negotiate with another device to select yet another driving model parameter set of the plurality of driving model parameter sets.

11. The safety system of claim 7, wherein at least some driving model parameter sets of the plurality of stored driving model parameter sets are associated with a driving lane characteristic;

wherein the one or more processors are further configured to determine a driving lane characteristic of the driving lane the vehicle is driving on; and select the driving model parameter set of the plurality of driving model parameter sets in accordance with the determined driving lane characteristic.

12. The safety system of claim 7, wherein the one or more processors are further configured to determine a weighted combination of the detected vehicle operation data;

determine whether the weighted combination triggers a change of the driving model parameters to changed driving model parameters; and control the vehicle to operate in accordance with the changed driving model parameters.

13. The safety system of claim 12, wherein the one or more processors are configured to quantize the weighted combination of the detected vehicle operation data; and determine whether the quantized weighted combination triggers a change of the driving model parameters to changed driving model parameters.

14. The safety system of claim 12, wherein the one or more processors are configured to check if the changed driving model parameters fulfill a predefined smoothness criterion, wherein the predefined smoothness criterion describes a smoothness of the change of the driving model parameters to the changed driving model parameters when controlling a control system of the vehicle to operate in accordance with the changed driving model parameters, and wherein the one or more processors are further configured to use the changed driving model parameters to control a control system of the vehicle to operate if the smoothness criterion is fulfilled.

15. The safety system of claim 12, wherein the one or more processors are configured to check if the changed driving model parameters meet with a safety guarantee in accordance with the driving model; and use the changed driving model parameters to control the control system of the vehicle to operate in accordance with the changed driving model parameters if the changed driving model parameters meet with a safety guarantee in accordance with the driving model.

16. The safety system of claim 1, wherein the vehicle operation data is selected from a group consisting of:
    a current road condition of the road on which the vehicle is traveling;
    a weather condition in an environment of the vehicle;
    the digital risk map comprising one or more regions in which a probability of a dangerous situation is indicated;
    a type of the vehicle;
    a status of the vehicle;
    a digital map; and
    a passenger input.

17. The safety system of claim 1, wherein detecting vehicle operation data comprises:
    using one or more image acquisition devices of the safety system of the vehicle to capture and analyze image data,
    wherein the one or more image acquisition devices includes one or more cameras mounted on the vehicle.

18. The safety system of claim 1, wherein the at least one distance includes a longitudinal distance and a lateral distance between the vehicle and the one or more objects.

19. The safety system of claim 1, wherein the one or more dangerous situations includes a dangerous lateral situation, a dangerous longitudinal situation, or a combination of a dangerous longitudinal and dangerous lateral situation.

20. A safety system server, the safety system server comprising:
    one or more processors configured to
    receive at least one situation report message comprising information about one or more classified situation classes associated with a time information, wherein the time information indicates at which time a respective classified situation class occurred, and wherein the one or more classified situation classes are determined by a safety system of a vehicle and further associated with a location information and vehicle operation data, wherein the location information indicates at which location a respective classified situation class occurred at the vehicle, and wherein the vehicle operation data includes information associated with conditions detected in an environment of the vehicle including at least one distance between the vehicle and one or more objects in the environment of the vehicle;
    generate or update a digital risk map comprising one or more regions in which one or more probabilities of one or more dangerous situations is indicated, wherein a point in the digital risk map is associated with a temperature vector including a criticality of one or more dangerous situations encountered at the point in the digital risk map, wherein the digital risk map is generated or updated based on the received at least one situation report message, wherein at least one probability is assigned to at least one respective dangerous situation, wherein the one or more dangerous situations is based on the at least one distance between the vehicle and the one or more objects in the environment of the vehicle relative to at least one distance threshold; and cause at least one of the vehicle or at least one second vehicle to be operated based on the digital risk map.

21. The safety system server of claim 20, wherein the one or more processors are configured to receive at least one situation report message from a plurality of vehicles, respectively.

22. A method of operating a safety system of a vehicle, the method comprising:
    detecting vehicle operation data during operation of the vehicle, wherein the vehicle operation data includes information associated with conditions detected in an environment of the vehicle including at least one distance between the vehicle and one or more objects in the environment of the vehicle;
    determining one or more dangerous situations using the vehicle operation data in accordance with a predefined driving policy, wherein the one or more dangerous situations is based on the at least one distance between the vehicle and the one or more objects in the environment of the vehicle relative to at least one distance threshold;
    classifying the one or more dangerous situations into one or more predefined situation classes;
    generating a situation report message comprising information about the one or more classified situation classes associated with a time information, wherein the time information indicates at which time a respective classified situation class occurred, and wherein the one or more classified situation classes is further associated with a location information indicating at which location a respective classified situation class occurred;
    based on the generated situation report message, cause generation or updating of a digital risk map, wherein the digital risk map includes a representation of at least one region associated with the one or more dangerous situations, and wherein a point in the digital risk map is associated with a temperature vector including a criticality of one or more dangerous situations encountered at the point in the digital risk map; and
    cause at least one of the vehicle or at least one second vehicle to be operated based on the digital risk map.

23. The method of claim 22, the method further comprising implementing a safety driving model.

24. The method of claim 22, the method further comprising classifying a dangerous situation of the one or more dangerous situations into a predefined situation class of the one or more predefined situation classes only if the dangerous situation has been determined for a predefined time period.

25. The method of claim 22, wherein the situation report message further comprises at least one of the following:
    response information indicating how the safety system reacted on a dangerous situation of the one or more dangerous situations;
    duration information indicating a time duration of a dangerous situation of the one or more dangerous situations;
    criticality information indicating a severity measure of a dangerous situation of the one or more dangerous situations;

safety system parameters in effect during the dangerous situation;

vehicle parameters that impact actuation;

vehicle's observed variables.

26. The method of claim 22, the method further comprising providing vehicle control information to control the vehicle in accordance with the digital risk map comprising one or more regions in which a probability of an associated dangerous situation is indicated.

27. A non-transitory computer readable medium comprising executable instructions that when executed by at least one processing device cause the at least one processing device to perform operations comprising:

detecting vehicle operation data during operation of a vehicle, wherein the vehicle operation data includes information associated with conditions detected in an environment of the vehicle including at least one distance between the vehicle and one or more objects in the environment of the vehicle;

determining one or more dangerous situations using the vehicle operation data in accordance with a predefined driving policy, wherein the one or more dangerous situations is based on the at least one distance between the vehicle and the one or more objects in the environment of the vehicle relative to at least one distance threshold;

classifying the one or more dangerous situations into one or more predefined situation classes;

generating a situation report message comprising information about the one or more classified situation classes associated with a time information, wherein the time information indicates at which time a respective classified situation class occurred, and wherein the one or more classified situation classes is further associated with a location information indicating at which location a respective classified situation class occurred;

based on the generated situation report message, cause generation or updating of a digital risk map, wherein the digital risk map includes a representation of at least one region associated with the one or more dangerous situations, and wherein a point in the digital risk map is associated with a temperature vector including a criticality of one or more dangerous situations encountered at the point in the digital risk map; and cause at least one of the vehicle or at least one second vehicle to be operated based on the digital risk map.

28. The non-transitory computer readable medium of claim 27, the operations further comprising classifying a dangerous situation of the one or more dangerous situations into a predefined situation class of the one or more predefined situation classes only if the dangerous situation has been determined for a predefined time period.

29. The non-transitory computer readable medium of claim 27, wherein the situation report message further comprises at least one of the following:

response information indicating how the safety system reacted on a dangerous situation of the one or more dangerous situations;

duration information indicating a time duration of a dangerous situation of the one or more dangerous situations;

criticality information indicating a severity measure of a dangerous situation of the one or more dangerous situations;

safety system parameters in effect during the dangerous situation;

vehicle parameters that impact actuation;

vehicle's observed variables.

30. The non-transitory computer readable medium of claim 27, the operations further comprising providing vehicle control information to control the vehicle in accordance with the digital risk map comprising one or more regions in which a probability of an associated dangerous situation is indicated.

* * * * *